(12) United States Patent
Suzuki et al.

(10) Patent No.: US 10,085,138 B2
(45) Date of Patent: *Sep. 25, 2018

(54) COMMUNICATION DEVICE

(71) Applicant: Brother Kogyo Kabushiki Kaisha, Nagoya-shi, Aichi-ken (JP)

(72) Inventors: Takanobu Suzuki, Nagoya (JP); Hirotaka Asakura, Nagoya (JP); Munehisa Matsuda, Nagoya (JP); Satoshi Tanaka, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/473,130

(22) Filed: Mar. 29, 2017

(65) Prior Publication Data

US 2017/0208431 A1 Jul. 20, 2017

Related U.S. Application Data

(63) Continuation of application No. 14/789,644, filed on Jul. 1, 2015, which is a continuation of application
(Continued)

(30) Foreign Application Priority Data

Mar. 30, 2012 (JP) ................................. 2012-082817

(51) Int. Cl.
*H04B 5/00* (2006.01)
*H04M 1/00* (2006.01)
(Continued)

(52) U.S. Cl.
CPC ............ *H04W 4/80* (2018.02); *G06F 3/1204* (2013.01); *G06F 3/1236* (2013.01);
(Continued)

(58) Field of Classification Search
CPC ....... H04W 4/008; H04W 8/18; H04W 84/12; H04B 5/0031; H04M 1/7253; H04N 21/258; H04N 21/25866
(Continued)

(56) References Cited

U.S. PATENT DOCUMENTS 7,532,908 B2   5/2009   Rofougaran et al.
8,041,299 B2   10/2011  Geldbach et al.
(Continued)

FOREIGN PATENT DOCUMENTS

CN   101771586 A   7/2010
CN   102202140 A   9/2011
(Continued)

OTHER PUBLICATIONS

Wi-Fi Peer-to-Peer (P2P) Technical Specification Version 1.1 2010 Wi-Fi Alliance.
(Continued)

*Primary Examiner* — Quochien B Vuong
(74) *Attorney, Agent, or Firm* — Banner & Witcoff, Ltd.

(57) ABSTRACT

A communication device may include a first type of interface and a second type of interface. The communication device may execute the communication of object data with a mobile device using the second type of interface after executing a specific process for causing the communication device to shift to a communication-enabled state, in a case where it is determined that the communication device is not currently in the communication-enabled state. Also, the communication device may execute the communication of the object data with the mobile device using the second type of interface without executing the specific process, in a case where it is determined that the communication device is currently in the communication-enabled state.

8 Claims, 17 Drawing Sheets

Related U.S. Application Data

No. 13/832,035, filed on Mar. 15, 2013, now Pat. No. 9,100,774.

(51) Int. Cl.

| | | |
|---|---|---|
| *H04W 4/80* | (2018.01) | |
| *H04W 4/00* | (2018.01) | |
| *H04W 76/02* | (2009.01) | |
| *G06F 3/12* | (2006.01) | |
| *H04N 1/00* | (2006.01) | |
| *H04W 76/11* | (2018.01) | |

(52) U.S. Cl.
CPC ....... *G06F 3/1292* (2013.01); *H04N 1/00307* (2013.01); *H04W 4/008* (2013.01); *H04W 76/021* (2013.01); *H04W 76/11* (2018.02); *H04N 2201/006* (2013.01); *H04N 2201/0039* (2013.01); *H04N 2201/0094* (2013.01)

(58) Field of Classification Search
USPC .......... 455/41.1, 41.2, 552.1, 553.1; 370/338
See application file for complete search history.

(56) References Cited

U.S. PATENT DOCUMENTS

| | | |
|---|---|---|
| 8,089,982 B1 | 1/2012 | Vleugels et al. |
| 8,249,499 B2 | 8/2012 | Waung et al. |
| 8,271,662 B1 | 9/2012 | Gossweiler, III et al. |
| 8,358,596 B2 | 1/2013 | Byrne et al. |
| 8,560,012 B2 | 10/2013 | Ohnishi et al. |
| 8,666,313 B2 | 3/2014 | Preston et al. |
| 8,768,331 B2 | 7/2014 | Nakajima |
| 8,891,771 B2 | 11/2014 | Sakai et al. |
| 8,973,078 B2 | 3/2015 | Nagara et al. |
| 9,042,940 B2 | 5/2015 | Suzuki et al. |
| 9,088,863 B2 | 7/2015 | Suzuki et al. |
| 2006/0067290 A1 | 3/2006 | Miwa et al. |
| 2007/0130296 A1 | 6/2007 | Kim |
| 2007/0204049 A1 | 8/2007 | Herrod |
| 2008/0090520 A1 | 4/2008 | Camp et al. |
| 2009/0033984 A1 | 2/2009 | Sahashi |
| 2009/0036056 A1 | 2/2009 | Oshima et al. |
| 2009/0047991 A1 | 2/2009 | Elg |
| 2009/0052348 A1 | 2/2009 | Kato et al. |
| 2009/0073482 A1 | 3/2009 | Tsuchiya |
| 2009/0103124 A1 | 4/2009 | Kimura et al. |
| 2009/0180451 A1 | 7/2009 | Alpert et al. |
| 2010/0069008 A1 | 3/2010 | Oshima et al. |
| 2010/0254349 A1 | 10/2010 | Aibara et al. |
| 2010/0291954 A1 | 11/2010 | Nakajima |
| 2010/0311330 A1 | 12/2010 | Aibara et al. |
| 2011/0058536 A1 | 3/2011 | Tsuchiya et al. |
| 2011/0075186 A1 | 3/2011 | Azuma |
| 2011/0142021 A1 | 6/2011 | Kito |
| 2011/0177780 A1 | 7/2011 | Sato et al. |
| 2011/0183614 A1 | 7/2011 | Tamura |
| 2011/0188391 A1 | 8/2011 | Sella et al. |
| 2011/0188658 A1 | 8/2011 | Sakai et al. |
| 2011/0237241 A1 | 9/2011 | Nagasaki |
| 2011/0271334 A1 | 11/2011 | Yang et al. |
| 2011/0275316 A1 | 11/2011 | Suumaki et al. |
| 2011/0292300 A1 | 12/2011 | Nagara et al. |
| 2011/0292445 A1 | 12/2011 | Kato |
| 2011/0294418 A1 | 12/2011 | Chen |
| 2011/0320611 A1 | 12/2011 | Inada et al. |
| 2012/0019674 A1 | 1/2012 | Ohnishi et al. |
| 2012/0069772 A1 | 3/2012 | Byrne et al. |
| 2013/0100855 A1 | 4/2013 | Jung et al. |
| 2013/0150016 A1 | 6/2013 | Nakajima |
| 2013/0231051 A1 | 9/2013 | Naruse |
| 2013/0237148 A1 | 9/2013 | McCann et al. |
| 2013/0260682 A1 | 10/2013 | Suzuki et al. |
| 2013/0260683 A1 | 10/2013 | Suzuki et al. |
| 2013/0260818 A1 | 10/2013 | Suzuki et al. |
| 2013/0260819 A1 | 10/2013 | Suzuki et al. |
| 2013/0269028 A1 | 10/2013 | Nakawatase et al. |
| 2013/0282914 A1 | 10/2013 | Jeong et al. |
| 2013/0303083 A1 | 11/2013 | Ando |

FOREIGN PATENT DOCUMENTS

| | | |
|---|---|---|
| EP | 2302882 A1 | 3/2011 |
| JP | 2007-166538 A | 6/2007 |
| JP | 2010-068022 A | 3/2010 |
| JP | 2010-081566 A | 4/2010 |
| JP | 2010-213334 A | 9/2010 |
| JP | 2010-268301 A | 11/2010 |
| JP | 2011-073272 A | 4/2011 |
| JP | 2011-130097 A | 6/2011 |
| JP | 2011-146991 A | 7/2011 |
| JP | 2011-151745 A | 8/2011 |
| JP | 2011-205581 A | 10/2011 |
| JP | 2011-249960 A | 12/2011 |
| JP | 2012-010080 A | 1/2012 |
| WO | 2005-034434 A1 | 4/2005 |
| WO | 2009/044228 A2 | 4/2009 |

OTHER PUBLICATIONS

Nov. 21, 2014—(US) Non-Final Office Action—U.S. Appl. No. 13/831,983.
Nov. 28, 2014—(US) Non-Final Office Action—U.S. Appl. No. 13/846,511.
Mar. 17, 2015—(US) Non-Final Office Action—U.S. Appl. No. 13/831,969.
Jul. 27, 2015—(CN) Notification of First Ofice Action—App 201310097507.9, Eng Tran.
Jul. 1, 2015—(CN) Notification of First Office Action—App 201310097576.X, Eng Tran.
Aug. 18, 2015—(CN) Notification of First Office Action—App 201310097272.3, Eng Tran.
Oct. 22, 2015—(US)—Final Office Action—U.S. Appl. No. 13/831,969.
Nov. 24, 2015—(JP) Notification of Reasons for Rejection—App 2012-082816, Eng Tran.
Nov. 17, 2015—(JP) Notification of Reasons for Rejection—App 2012-082815, Eng Tran.
Mar. 1, 2016—(JP) Notification of Reasons for Rejection—App 2012-082817, Eng Tran.
Sep. 26, 2016—(EP) Extended Search Report—App 13159612.4.
"Specification of the Bluetooth System; Bluetooth 11 Profiles Book", IEEE Draft, Bluetooth 11 Profiles Book, IEEE-SA, Piscataway, NJ USA, vol. 802.15, Apr. 30, 2001, pp. 1-452, XP017620837 [retrieved Apr. 30, 2001].
Oct. 6, 2016—(EP) Extended Search Report and Opinion—App 13159613.
Nov. 7, 2016—(US) Non-Final Office Action—U.S. Appl. No. 15/198,599.
Dec. 2, 2016—Non-Final Office Action—U.S. Appl. No. 14/789,696.
Dec. 6, 2016—(JP) Notification of Reasons for Rejection—App 2016-076376, Eng Tran.
Jul. 26, 2017—(EP) Extended Search Report—App 13159608.2.
Jun. 16, 2017—(US) Final Office Action—U.S. Appl. No. 15/198,599.
Nov. 13, 2017—(EP) Office Action—App 13159612.4.
Nov. 14, 2017—(EP) Office Action—App 13159613.2.
Jan. 16, 2018—(US) Non-Final Office Action—U.S. Appl. No. 15/198,599.
Sep. 29, 2017—(US) Non-Final Office Action—U.S. Appl. No. 14/789,696.
Feb. 16, 2018—(US) Final Office Action—U.S. Appl. No. 14/789,696.
Jul. 10, 2018—(EP) Office Action—App 13159613.2.
Aug. 9, 2018—(U.S.) Final Office Action—U.S. Appl. No. 15/198,599.

(Tenth Situation)

(Eleventh Situation)

COMMUNICATION DEVICE

CROSS-REFERENCE TO RELATED APPLICATION

This application is a continuation of prior U.S. application Ser. No. 14/789,644, filed Jul. 1, 2015, which is a continuation of prior U.S. application Ser. No. 13/832,035, filed Mar. 15, 2013, now U.S. Pat. No. 9,100,774 B2, issued Aug. 4, 2015, which claims priority to Japanese Patent Application No. 2012-082817, filed on Mar. 30, 2012, the contents of which are hereby incorporated by reference into the present application.

TECHNICAL FIELD

A technique disclosed in the present specification relates to a communication device for executing communication of object data with a mobile device.

DESCRIPTION OF RELATED ART

A technique for two communication devices to execute wireless communication is known. The two communication devices execute communication of a wireless setting according to a short-range wireless communication system (i.e., a wireless communication according to NFC (abbreviation of: Near Field Communication)). The wireless setting is a setting for executing wireless communication according to a communication system different from the NFC system (e.g., IEEE 802.11a, 802.11b). Thereby, the two communication devices become capable of executing wireless communication according to the wireless setting.

SUMMARY

The present specification discloses a technique for a communication device to appropriately execute communication with a mobile device.

A technique disclosed herein is a communication device. The communication device may comprise a first type of interface for executing a communication with a portable terminal and a second type of interface for executing a communication with the mobile device. The communication device may comprise one or more processors and a memory that stores computer-readable instructions therein. The computer-readable instructions, when executed by the one or more processors, may cause the communication device to execute (A) receiving specific information from the mobile device using the first type of interface, (B) determining, using the specific information, whether or not the communication device is currently in a communication-enabled state in which the communication device is currently capable of executing a communication of object data with the mobile device using the second type of interface, (C) executing the communication of the object data with the mobile device using the second type of interface after executing a specific process for causing the communication device to shift to the communication-enabled state, in a case where it is determined that the communication device is not currently in the communication-enabled state and (D) executing the communication of the object data with the mobile device using the second type of interface without executing the specific process, in a case where it is determined that the communication device is currently in the communication-enabled state.

Moreover, a control method, a computer program, and a non-transitory computer-readable storage medium computer-readable instructions for the communication device, are also novel and useful. Further, a communication system including the communication device and the mobile device are also novel and useful.

EMBODIMENT

First Embodiment (Configuration of Communication System)

Figure 1:
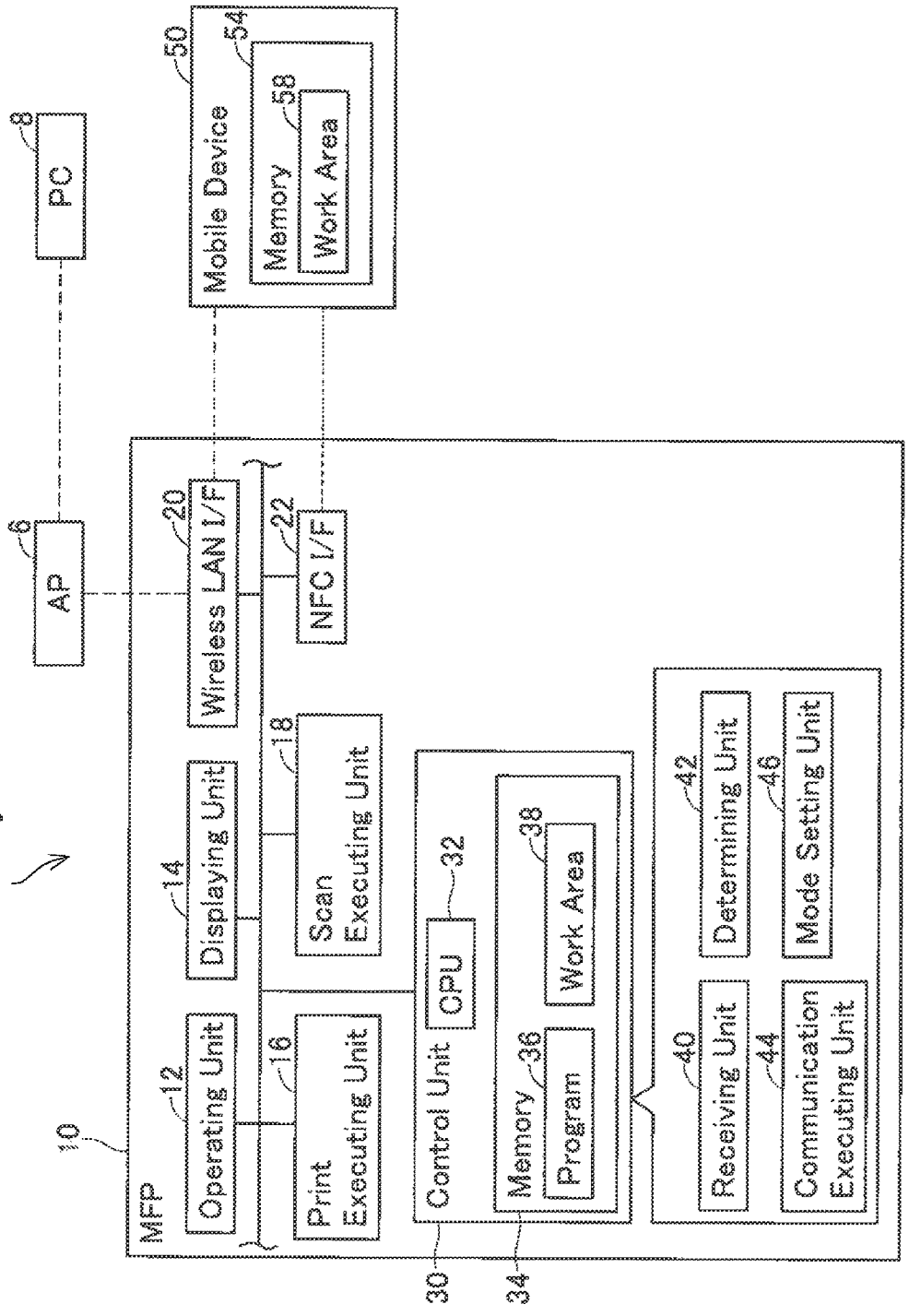
FIG. 1 shows the configuration of a communication system.

As shown in FIG. 1, a communication system 2 comprises a multi-function peripheral (called "MFP" (abbreviation of: Multi-Function Peripheral) below) 10, a mobile device 50, an access point (called "AP" below) 6, and a PC 8. The MFP 10 and the mobile device 50 are capable of executing short-range wireless communication. The short-range wireless communication is according to the wireless communication NFC system. In the present embodiment, the wireless communication is executed according to the NFC system based on international standards ISO/IEC 21481 or 18092.

Further, the MFP 10 is capable of executing wireless communication according to the Wi-Fi Direct system (to be described). Below, Wi-Fi Direct is called "WFD". In WFD, wireless communication is executed based on IEEE (abbreviation of: The Institute of Electrical and Electronics Engineers, Inc.) 802.11 standard and standards based on thereon (e.g., 802.11a, 11b, 11g, 11n, etc.). The NFC system and the system of WFD (called "WFD system" below) have different wireless communication systems (i.e., wireless communication standards). Further, the communication speed of wireless communication according to the WFD system is faster than the communication speed of wireless communication according to the NFC system.

For example, the MFP 10 can construct a WFD network by establishing a connection with the mobile device 50 according to the WFD system (called "WFD connection" below). Similarly, the MFP 10 can construct a WFD network by establishing a WFD connection with the PC 8.

The PC 8, the MFP 10 and the mobile device 50 are further capable of executing wireless communication according to a normal Wi-Fi system (e.g., IEEE 802.11) different from the WFD system. In general terms, wireless communication according to normal Wi-Fi is wireless communication using the AP 6, and wireless communication according to the WFD system is wireless communication not using the AP 6. For example, the MFP 10 can belong to a normal Wi-Fi network by establishing a connection with the AP 6 (called "normal Wi-Fi connection" below) according to normal Wi-Fi. Via the AP 6, the MFP 10 can execute wireless communication with another device belonging to the normal Wi-Fi network (e.g., the PC 8, the mobile device 50). Moreover, the NFC system and the system of normal Wi-Fi (called "the normal Wi-Fi system" below) have different wireless communication systems (i.e., wireless communication standards). Further, the communication speed of normal Wi-Fi is faster than the communication speed of NFC.

(WFD)

WFD is a standard formulated by Wi-Fi Alliance. WFD is described in "Wi-Fi Peer-to-Peer (P2P) Technical Specification Version 1.1", created by Wi-Fi Alliance.

As described above, the PC 8, the MFP 10, and the mobile device 50 are each capable of executing wireless communication according to the WFD system. Below, an apparatus capable of executing wireless communication according to the WFD system is called a "WFD-compatible apparatus". According to the WFD standard, three states are defined as the states of the WFD-compatible apparatus: Group Owner state (called "G/O state" below), client state, and device state. The WFD-compatible apparatus is capable of selectively operating in one state among the three states.

One WFD network includes an apparatus in the G/O state and an apparatus in the client state. Only one G/O state apparatus can be present in the WFD network, but one or more client state apparatuses can be present. The G/O state apparatus manages the one or more client state apparatuses. Specifically, the G/O state apparatus creates an administration list in which identification information (i.e., MAC address) of each of the one or more client state apparatuses is written. When a client state apparatus newly belongs to the WFD network, the G/O state apparatus adds the identification information of that apparatus to the administration list, and when the client state apparatus leaves the WFD network, the G/O state apparatus deletes the identification information of that apparatus from the administration list.

The G/O state apparatus is capable of wirelessly communicating object data (e.g., data that includes network layer information of the OSI reference model (print data, scan data, etc.)) with an apparatus registered in the administration list, i.e., with a client state apparatus (i.e., an apparatus belonging to the WFD network). However, with an unregistered apparatus which is not registered in the administration list, the G/O state apparatus is capable of wirelessly communicating data for the unregistered apparatus to belong to the WFD network (e.g., data that does not include network layer information (physical layer data such as a Probe Request signal, Probe Response signal, etc.)), but is not capable of wirelessly communicating the object data. For example, the MFP 10 that is in the G/O state is capable of wirelessly receiving print data from the mobile device 50 that is registered in the administration list (i.e., the mobile device 50 that is in the client state), but is not capable of wirelessly receiving print data from an apparatus that is not registered in the administration list.

Further, the G/O state apparatus is capable of relaying the wireless communication of object data (print data, scan data, etc.) between a plurality of client state apparatuses. For example, in a case where the mobile device 50 that is in the client state is to wirelessly send print data to another printer that is in the client state, the mobile device 50 first wirelessly sends the print data to the MFP 10 that is in the G/O state. In this case, the MFP 10 wirelessly receives the print data from the mobile device 50, and wirelessly sends the print data to the other printer. That is, the G/O state apparatus is capable of executing the function of an AP of the normal wireless network.

Moreover, a WFD-compatible apparatus that does not belong to the WFD network (i.e., an apparatus not registered in the administration list) is a device state apparatus. The device state apparatus is capable of wirelessly communicating data for belonging to the WFD network (physical layer data such as a Probe Request signal, Probe Response signal, etc.), but is not capable of wirelessly communicating object data (print data, scan data, etc.) via the WFD network.

Moreover, below, an apparatus that is not capable of executing wireless communication according to the WFD system, but is capable of executing wireless communication according to normal Wi-Fi is called a "WFD-incompatible apparatus". The "WFD-incompatible apparatus" may also be called a "legacy apparatus". A WFD-incompatible apparatus cannot operate in the G/O state. A G/O state apparatus can register identification information of the WFD-incompatible apparatus in the administration list.

(Configuration of MFP 10)

The MFP 10 comprises an operating unit 12, a displaying unit 14, a print executing unit 16, a scan executing unit 18, a wireless LAN interface (an "interface" is called "I/F" below) 20, an NFC I/F 22, and a control unit 30. The operating unit 12 consists of a plurality of keys. A user can input various instructions to the MFP 10 by operating the operating unit 12. The displaying unit 14 is a display for displaying various types of information. The print executing unit 16 is an ink jet system, laser system, etc. printing mechanism. The scan executing unit 18 is a CCD, CIS, etc. scanning mechanism.

The wireless LAN I/F 20 is an interface for the control unit 30 to execute wireless communication according to the WFD system and wireless communication according to normal Wi-Fi. The wireless LAN I/F 20 is physically one interface. However, a MAC address used in wireless communication according to the WFD system (called "MAC address for WFD" below) and a MAC address used in wireless communication according to normal Wi-Fi (called "MAC address for normal Wi-Fi" below) are both assigned to the wireless LAN I/F 20. More specifically, the MAC address for the normal Wi-Fi is pre-assigned to the wireless LAN I/F 20. Using the MAC address for the normal Wi-Fi, the control unit 30 creates the MAC address for WFD, and assigns the MAC address for WFD to the wireless LAN I/F 20. The MAC address for WFD differs from the MAC address for the normal Wi-Fi. Consequently, via the wireless LAN I/F 20, the control unit 30 can simultaneously execute both wireless communication according to the WFD system and wireless communication according to the normal Wi-Fi. Consequently, a situation can be established in which the MFP 10 belongs to the WFD network and belongs to the normal Wi-Fi network.

Moreover, the G/O state apparatus can write, in the administration list, not only the identification information of the WFD-compatible apparatus that is in the client state, but also the identification information of a WFD-incompatible apparatus. That is, the G/O state apparatus can also establish the WFD connection with the WFD-incompatible apparatus. In general terms, the WFD connection is a wireless connection in which the MAC address for the WFD of the MFP 10 is used. Further, the WFD network is a wireless network in which the MAC address for the WFD of the MFP 10 is used. Similarly, the normal Wi-Fi connection is a wireless connection in which the MAC address for the normal Wi-Fi of the MFP 10 is used. Further, the normal Wi-Fi network is a wireless network in which the MAC address for the normal Wi-Fi of the MFP 10 is used.

By operating the operating unit 12, the user can change a setting of the wireless LAN I/F 20, thereby being able to change to either mode of a mode in which wireless communication according to the WFD system using the wireless LAN I/F 20 can be executed (called "WFD=ON mode" below), and a mode in which wireless communication according to the WFD system using the wireless LAN I/F 20 cannot be executed (called "WFD=OFF mode" below). A mode setting unit 46 sets the mode to either WFD=ON mode or WFD=OFF mode in accordance with the operation of the user. Specifically, the mode setting unit 46 stores, in the memory 34, a mode value representing the mode set by the user.

Moreover, in the WFD I/F=OFF mode state, the control unit 30 cannot execute processes according to the WFD system (e.g., a process of setting the MFP 10 to spontaneous G/O mode (to be described), G/O negotiation, etc.). In the WFD I/F=ON state, the memory 34 stores values representing the current state of the MFP 10 relating to WFD (the state from among G/O state, client state, and device state).

The NFC I/F 22 is an interface for the control unit 30 to execute wireless communication according to the NFC system. The NFC I/F 22 is formed of a chip differing physically from the wireless LAN I/F 20.

Moreover, the communication speed of wireless communication via the wireless LAN I/F 20 (e.g., maximum communication speed is 11 to 454 Mbps) is faster than the communication speed of wireless communication via the NFC I/F 22 (e.g., maximum communication speed is 100 to 424 Kbps). Further, the frequency of the carrier wave in wireless communication via the wireless LAN I/F 20 (e.g., 2.4 GHz band, 5.0 GHz band) differs from the frequency of the carrier wave in the wireless communication via the NFC I/F 22 (e.g., 13.56 MHz band). Further, in a case where the distance between the MFP 10 and the mobile device 50 is less than or equal to approximately 10 cm, the control unit 30 can wirelessly communicate with the mobile device 50 according to the NFC system via the NFC I/F 22. In a case where the distance between the MFP 10 and the mobile device 50 is either less than or equal to 10 cm, or is greater than or equal to 10 cm (e.g., a maximum is approximately 100 m), the control unit 30 can wirelessly communicate, via the wireless LAN I/F 20, with the mobile device 50 according to the WFD system and according to the normal Wi-Fi. That is, the maximum distance across which the MFP 10 can execute wireless communication with a communication destination apparatus (e.g., the mobile device 50) via the wireless LAN I/F 20 is greater than the maximum distance across which the MFP 10 can execute the wireless communication with the communication destination apparatus via the NFC I/F 22.

The control unit 30 comprises a CPU 32 and the memory 34. The CPU 32 executes various processes according to programs stored in the memory 34. The CPU 32 realizes the functions of the units 40 to 46 by executing processes according to the programs.

The memory 34 is formed of a ROM, RAM, hard disk, etc. The memory 34 stores the programs executed by the CPU 32. The memory 34 comprises a work area 38. In the case where the MFP 10 currently belongs to a WFD network, the work area 38 stores information indicating that the MFP 10 currently belongs to the WFD network, and a wireless setting (including authentication method, encryption method, password, SSID (Service Set Identifier) and BSSID (Basic Service Set Identifier) of the wireless network) for communicating object data (e.g., print data) via the WFD network. Further, in the case where the MFP 10 currently belongs to a normal Wi-Fi network, the work area 38 stores information indicating that the MFP 10 currently belongs to the normal Wi-Fi network, and a wireless setting for communicating object data via the normal Wi-Fi network. The SSID of the WFD network is a network identifier for identifying the WFD network, and the SSID of the normal Wi-Fi network is a network identifier for identifying the normal Wi-Fi network. The BSSID of the WFD network is an identifier unique to the G/O state apparatus (e.g., the MAC address of the G/O state apparatus), and the BSSID of the normal Wi-Fi network is an identifier unique to the AP (e.g., a unique identifier of the AP).

In the case where the MFP 10 is operating according to the WFD system, the work area 38 further stores a value indicating the current state of WFD (one state from among G/O state, client state, or device state). The work area 38 further stores a mode value representing the WFD=ON mode, or a mode value representing the WFD=OFF mode.

Moreover, by operating the operating unit 12, the user can set the MFP 10 to spontaneous G/O mode. Spontaneous G/O mode is a mode for maintaining the operation of the MFP 10 in the G/O state. The work area 38 within the memory 34 further stores a value indicating whether the MFP 10 has been set to spontaneous G/O mode. When the WFD-compatible apparatus that is in the device state is to establish a WFD connection with another WFD-compatible apparatus that is in the device state, the WFD-compatible apparatus usually executes G/O negotiation to selectively determine which state, of G/O state and client state, it is to operate in. In the case where the MFP 10 has been set to the spontaneous G/O mode, the MFP 10 maintains operation in the G/O state without executing G/O negotiation.

(Configuration of Mobile Device 50)

The mobile device 50 is, for example, a mobile phone (e.g., a Smart Phone), PDA, notebook PC, tablet PC, portable music player, portable video player, etc. The mobile device 50 comprises two wireless interfaces, a wireless LAN I/F (i.e., an interface for WFD and normal Wi-Fi) and an NFC I/F. Consequently, the mobile device 50 is capable of executing wireless communication with the MFP 10 using the wireless LAN I/F, and is capable of executing wireless communication with the MFP 10 using the NFC I/F. The mobile device 50 comprises an application program for causing the MFP 10 to execute functions (e.g., print function, scan function, etc.). Moreover, the application program may, for example, be installed on the mobile device 50 from a server provided by a vendor of the MFP 10, or may be installed on the mobile device 50 from a media shipped together with the MFP 10.

Like the MFP 10, the mobile device 50 comprises a work area 58 within a memory 54. In the case where the mobile device 50 currently belongs to the WFD network or the normal Wi-Fi network, the work area 58 stores a wireless setting (including authentication method, encryption method, password, SSID and BSSID of the wireless network) for executing communication via the relevant network. Further, in the case where the mobile device 50 is operating according to the WFD system, the work area 58 stores a state value representing the state of the mobile device 50 (i.e., one state from among G/O state, client state and device state).

(Configuration of PC 8)

The PC 8 comprises a wireless LAN I/F (i.e., an interface for WFD and normal Wi-Fi), but does not comprise an NFC I/F. Consequently, the PC 8 is capable of executing communication with the MFP 10 by using the wireless LAN I/F, but is not capable of executing wireless communication according to the NFC system. The PC 8 comprises a driver program for causing the MFP 10 to execute a process (e.g., print process, scan process, etc.). Moreover, the driver program is usually installed on the PC 8 from a media shipped together with the MFP 10. However, in a modification, the driver program may be installed on the PC 8 from a server provided by the vendor of the MFP 10.

(Configuration of AP 6)

The AP 6 is not a WFD G/O state apparatus, but is a standard access point called a wireless access point or wireless LAN router. The AP 6 can establish a normal Wi-Fi connection with a plurality of apparatuses. Thereby, a normal Wi-Fi network including the AP 6 and the plurality of apparatuses is constructed. The AP 6 receives data from one apparatus from among the plurality of apparatuses belonging to the normal Wi-Fi network, and sends the data to another one apparatus from among the plurality of apparatuses. That is, the AP 6 relays communication between a pair of apparatuses belonging to the normal Wi-Fi network.

Moreover, differences between the WFD G/O state apparatus and the normal AP are as follows. In the case where the WFD G/O state apparatus disconnects from the WFD network to which it currently belongs, and newly belongs to another WFD network, the WFD G/O state apparatus can operate in a state other than the G/O state (i.e., the client state). By contrast, a normal AP (i.e., the AP 6) executes the function of relaying communication between the pair of apparatuses regardless of which normal Wi-Fi network the normal AP belongs to, and the normal AP cannot operate in the client state.

(Communication Process Executed by MFP 10)

A communication process executed by the MFP 10 will be described with reference to FIG. 2. When a power source of the MFP 10 is turned ON, the control unit 30 executes a communication process. In S2, a receiving unit 40 monitors whether NFC information has been received by executing wireless communication according to the NFC system. Moreover, the receiving unit 40 receives the NFC information via the NFC I/F 22. Specifically, the receiving unit 40 monitors whether an NFC communication session has been established between the MFP 10 and the mobile device 50. While the power source of the MFP 10 is ON, the receiving unit 40 causes the NFC I/F 22 to transmit radio waves for detecting a device capable of executing wireless communication according to the NFC system.

The user of the mobile device 50 activates the application program. By operating the mobile device 50, the user causes the mobile device 50 to create NFC information that includes a process execution instruction (e.g., print instruction, scan instruction) indicating a process that the MFP 10 is to execute. In the case where the mobile device 50 currently belongs to a wireless network, the NFC information further includes the SSID and BSSID of the wireless network to which the mobile device 50 currently belongs. Moreover, the case where the mobile device 50 currently belongs to the wireless network is a case in which a wireless connection, this being the WFD connection or the normal Wi-Fi connection, or both, has been established between the mobile device 50 and another device (e.g., the AP 6, the MFP 10).

The user can bring the mobile device 50 closer to the MFP 10. Thereby, when the distance between the mobile device 50 and the MFP 10 becomes less than the distance (e.g., 10 cm) where the radio waves reach each other, the mobile device 50 receives a radio wave from the MFP 10, and sends a response wave to the MFP 10. Consequently, the control unit 30 receives the response wave from the mobile device 50, and an NFC communication session is established. When the NFC communication session has been established, the mobile device 50 sends the created NFC information to the MFP 10.

Upon receiving the NFC information (YES in S2), in S4 a determining unit 42 determines whether the MFP 10 currently belongs to a network. Specifically, in the case where the work area 38 stores information indicating that the MFP 10 currently belongs to the WFD network or information indicating that the MFP 10 currently belongs to the normal Wi-Fi network, or both, the determining unit 42 determines that the MFP 10 currently belongs to a wireless network (YES in S4), and the process proceeds to S6. On the other hand, in the case where neither the information indicating that the MFP 10 currently belongs to the WFD network or the information indicating that the MFP 10 currently belongs to the normal Wi-Fi network is stored in the work area 38, the determining unit 42 determines that the MFP 10 does not currently belong to a wireless network (NO in S4), and the process proceeds to S8.

In S6, the determining unit 42 confirms whether the mobile device 50 currently belongs to the network to which the MFP 10 currently belongs. Specifically, the determining unit 42 first determines whether the SSID and BSSID of the network to which the mobile device 50 currently belongs are included in the NFC information. In the case where the SSID and BSSID are not included in the NFC information, the determining unit 42 determines that the mobile device 50 does not currently belong to the network to which the MFP 10 currently belongs (NO in S6). According to this configuration, the MFP 10 can appropriately determine that the mobile device 50 does not currently belong to the network to which the MFP 10 currently belongs. In the case where the SSID and BSSID of the network to which the mobile device 50 currently belongs are included in the NFC information, the determining unit 42 determines whether the SSID and BSSID included in the wireless setting stored in the work area 38 are identical to the SSID and BSSID included in the NFC information.

In the case where the SSIDs and BSSIDs are both identical, it is determined that the mobile device 50 currently belongs to the network to which the MFP 10 currently belongs (YES in S6), and the process proceeds to S7. On the other hand, in the case where the SSIDs or the BSSIDs, or both are not identical, it is determined that the mobile device 50 does not currently belong to the network to which the MFP 10 currently belongs (NO in S6), and the process proceeds to S8. According to this configuration, the MFP 10 can appropriately determine whether the mobile device 50 currently belongs to the network to which the MFP 10 currently belongs. Moreover, in S6 the determining unit 42 determines whether the SSIDs are identical, and whether the BSSIDs are identical. Thereby, the determining unit 42 can determine whether the MFP 10 and the mobile device 50 belong to the same wireless network constructed by the same AP. More specifically, one AP may construct a plurality of wireless networks by using a plurality of SSIDs. Consequently, in the case where the BSSIDs are identical and the SSIDs are not identical, the MFP 10 and the mobile device 50 could belong to different wireless networks constructed by the same AP. In the present embodiment, it is possible to determine more reliably whether the MFP 10 and the mobile device 50 belong to the same wireless network by determining whether both the SSIDs and BSSIDs are identical. Moreover, in a modification, it is determined in S6 whether the SSIDs are identical, but it need not be determined whether the BSSIDs are identical. Thereby, if the SSIDs are identical, it can be determined that the MFP 10 and the mobile device 50 belong to the same wireless network even in the case where the MFP 10 and the mobile device 50 each belong to a wireless network constructed by a different access point.

In the case where the mobile device 50 currently belongs to the network to which the MFP 10 currently belongs, the MFP 10 and the mobile device 50 can execute communication via the network to which they currently belong. That is, the mobile device 50 can execute wireless communication with the MFP 10 by using the wireless setting currently stored in the work area 58. In S7 the control unit 30 sends, without changing the wireless setting of the mobile device 50, information indicating setting change is unnecessary via the NFC I/F 22, this information indicating setting change is unnecessary indicating that the communication of data can be executed, and the process proceeds to S20. Moreover, the information indicating setting change is unnecessary includes the IP address of the MFP 10.

In S8 the determining unit 42 determines whether WFD=ON mode has been set. In the case where the mode value stored in the memory 34 is a value representing WFD=ON mode, the determining unit 42 determines YES in S8, and proceeds to S10. On the other hand, in the case where the mode value stored in the memory 34 is a value representing WFD=OFF mode, the determining unit 42 determines NO in S8, and the process proceeds to S9.

In S9 a communication executing unit 44 changes the mode from WFD=OFF mode to WFD=ON mode by changing the mode value stored in the memory 34, and the process proceeds to S15. The communication executing unit 44 further stores, in the memory 34, setting change information indicating that the mode value has been changed.

In S10 the determining unit 42 determines whether the MFP 10 is operating in the client state in the wireless network to which it currently belongs. Specifically, in the case where the state value stored in the work area 38 is a value representing the client state, the determining unit 42 determines that the MFP 10 is operating in the client state (YES in S10). On the other hand, in the case where the state value stored in the work area 38 is not a value representing the client state, the determining unit 42 determines that the MFP 10 is not operating in the client state (NO in S10). In the case of YES in S10, the process proceeds to S14.

On the other hand, in the case of NO in S10, in S12 the determining unit 42 determines whether the MFP 10 is operating in the G/O state in the wireless network to which it currently belongs. Specifically, in the case where the state value stored in the work area 38 is a value representing the G/O state, the determining unit 42 determines that the MFP 10 is operating in the G/O state (YES in S12). On the other hand, in the case where the state value stored in the work area 38 is not a value representing the G/O state, the determining unit 42 determines that the MFP 10 is not operating in the G/O state (i.e., the MFP 10 is in the device state) (NO in S12). In the case of YES in S12, the process proceeds to S13, and in the case of NO in S12, the process proceeds to S15.

In S13 the determining unit 42 determines whether or not the number of apparatuses other than the MFP 10 included in the WFD network in which the MFP 10 is operating in the G/O state (i.e., apparatuses which have established a connection with the MFP 10) is less than a predetermined maximum client number. The determining unit 42 determines YES in S13 in the case where the number of identification information of apparatuses stored in the administration list is less than the maximum client number, and determines NO in S13 in the case where the number is the same. In the case of YES in S13, the process proceeds to S16, and in the case of NO in S13, the process proceeds to S14.

In S14 the communication executing unit 44 sends communication NG information to the mobile device 50 by using the NFC I/F 22 the process returns to S2. This communication NG information may indicate that the MFP 10 and the mobile device 50 currently cannot execute communication.

In S15 the communication executing unit 44 sets the MFP 10 to spontaneous G/O mode. Spontaneous G/O mode is a mode which keeps the MFP 10 operating in the G/O state. Consequently, the MFP 10 is set to the G/O state although a WFD network has not been constructed at the stage of S15. In the case where the MFP 10 is set to the G/O state, the communication executing unit 44 prepares a wireless setting (SSID, BSSID, authentication method, encryption method, password, etc.) for the WFD-compatible apparatus and/or the WFD-incompatible apparatus to execute wireless communication, via the WFD network, with the MFP 10 that is operating in the G/O state. According to this configuration, the MFP 10 can execute wireless communication with the apparatus that receives the wireless setting from the MFP 10 regardless of whether the apparatus that receives the wireless setting (the mobile device 50 in the present embodiment) is a WFD-compatible apparatus or a WFD-incompatible apparatus.

Moreover, the authentication method and encryption method are predetermined. Further, the communication executing unit 44 creates a password. Moreover, the SSID may be created by the communication executing unit 44 at the time the password is created, or may be predetermined. The BSSID is the MAC address of the MFP 10. Moreover, at this stage, identification information of the apparatus connected with the G/O state apparatus is not described in the administration list managed by the MFP 10.

In S16, the communication executing unit 44 sends the prepared wireless setting to the mobile device 50 using the NFC I/F 22. In the case where process S16 is executed after process S15, the communication executing unit 44 sends, to the mobile device 50, the wireless setting which was prepared at the stage of setting the spontaneous G/O mode (S15). In the case where process S16 is executed after process S13, the communication executing unit 44 uses the NFC I/F 22 to send, to the mobile device 50, the wireless setting which was prepared at the stage of constructing the WFD network in which the MFP 10 is operating in the G/O state.

Next, in S18 the communication executing unit 44 establishes a WFD connection between the MFP 10 and the mobile device 50 by using the wireless LAN I/F 20. Upon receiving, from the MFP 10, the wireless setting of the MFP 10 that is operating in the G/O state, the mobile device 50 stores the received wireless setting in the work area 58. Consequently, the mobile device 50 executes wireless communication according to normal Wi-Fi. Next, the communication executing unit 44 executes the wireless communication of an Authentication Request, Authentication Response, Association Request, Association Response, and 4way handshake with the mobile device 50. Various authentication processes such as authentication of SSID, authentication of authentication method and encryption method, authentication of password, etc. are executed during the course of the wireless communication. In a case where all the authentications succeed, a wireless connection is established between the MFP 10 and the mobile device 50.

Moreover, in the process S18, the communication executing unit 44 acquires the MAC address of the mobile device 50 by using the wireless LAN I/F 20. When the wireless connection has been established, the control unit 30 further adds the MAC address of the mobile device 50 to the administration list. Moreover, the MAC address of the mobile device 50 is included in the NFC information. Thereby, the MFP 10 that is in the G/O state becomes able to communicate object data (print data, scan data, etc.) with the mobile device 50 according to the normal Wi-Fi. Moreover, the object data includes network layer data, which is a layer higher than the physical layer of the OSI reference model. Consequently, the MFP 10 that is in the G/O state can execute wireless communication of the network layer with the mobile device 50 that is in the client state.

Next, in S20 the communication executing unit 44 executes a data communication process with the mobile device 50 via the wireless LAN I/F 20. The contents of the data communication process vary depending on the contents of the process execution instruction included in the NFC information. In the case where the process execution instruction is a print instruction, the communication executing unit 44 receives print data from the mobile device 50 in the data communication process. In this case, the control unit 30 causes the print executing unit 16 to execute a print process using the received print data.

On the other hand, in the case where the process execution instruction is a scan instruction, the control unit 30 causes the scan executing unit 18 to scan a document that has been set on the scan executing unit 18, creating scan data. Next, the communication executing unit 44 sends the created scan data to the mobile device 50.

Next, in S21 the communication executing unit 44 monitors, by using the wireless LAN I/F 20, whether a disconnection request for disconnecting the connection with the mobile device 50 has been received from the mobile device 50. In the case where a disconnection request has not been received even though a predetermined time has elapsed (NO in S21), the process returns to S2. On the other hand, in the case where a disconnection request has been received from the mobile device 50 within a predetermined time since the ending of the data communication process of S20 (YES in S21), the communication executing unit 44 disconnects the wireless connection with the mobile device 50. Specifically, the communication executing unit 44 deletes the MAC address of the mobile device 50 within the administration list. Next, in S22 the communication executing unit 44 determines whether the setting of the wireless LAN I/F 20 was changed by the process S9. Specifically, in the case where setting change information is being stored in the memory 34, the communication executing unit 44 determines that the mode value was changed in S9 from the mode value indicating WFD=OFF mode to the mode value indicating WFD=ON mode (YES in S22), and proceeds to S23. On the other hand, in the case where setting change information is not being stored in the memory 34, the communication executing unit 44 determines that the mode value was not changed in S9 from the mode value indicating WFD=OFF mode to the mode value indicating WFD=ON mode (NO in S22), and the process returns to S2.

In S23, the communication executing unit 44 determines whether an external device (e.g., the PC 8) other than the mobile device 50 currently belongs to the WFD network newly constructed in S18. Specifically, in the case where identification information other than the identification information of the mobile device 50 is included in the administration list, the communication executing unit 44 determines that the external device currently belongs to the WFD network (YES in S23). In this case, without changing the mode value, the process returns to S2. According to this configuration, it is possible to prevent the MFP 10 from being disconnected from the WFD network in the case where the external device currently belongs to the WFD network.

On the other hand, in the case where identification information other than the mobile device 50 is not included in the administration list, the communication executing unit 44 determines that the external device does not currently belong to the WFD network (NO in S23), and proceeds to S24. In S24 the communication executing unit 44 changes the mode value from the mode value indicating WFD=ON mode to the mode value indicating the WFD=OFF mode, and the process returns to S2. That is, in the communication process, in the case where it is determined in S8 that the mode value is the WFD=OFF mode, the mode value is changed from the WFD=OFF mode to the WFD=ON mode so that wireless communication with the mobile device 50 is executed temporarily via the WFD network by using the wireless LAN I/F 20. When the mode value is changed from the WFD=ON mode to the WFD=OFF mode in S25, the WFD network constructed in S18 ceases to exist. According to this configuration, in the case where the mode value was changed from the mode value indicating WFD=OFF mode to the mode value indicating the WFD=ON mode during the communication process, it is possible to return to the setting from before the mode value was changed.

Advantages of Present Embodiment

Advantages of the present embodiment in first to fifth situations will be described with reference to FIGS. 3 to 7. Moreover, processes corresponding to the communication process of FIG. 2 are shown in each of FIGS. 3 to 7.

(First Situation)

Figure 3:
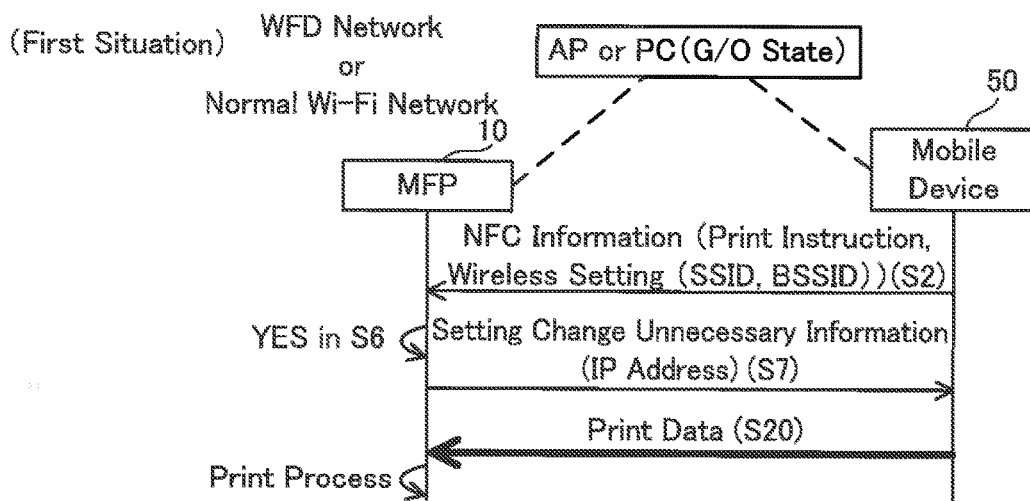
FIG. 3 shows a sequence view for explaining processes executed by devices in a first situation.

The first situation shown in FIG. 3 is a situation where the MFP 10 and the mobile device 50 currently belong to the same WFD network or the same normal Wi-Fi network. In this situation, when NFC information is received from the mobile device 50 by using the NFC I/F 22, in S6 the MFP 10 determines that the mobile device 50 currently belongs to the network to which the MFP 10 currently belongs (YES in S6). In S7 the MFP 10 sends the information indicating setting change is unnecessary to the mobile device 50 by using the NFC I/F 22. Upon receiving the information indicating setting change is unnecessary, the mobile device 50 sends print data to the MFP 10 using the IP address included in the information indicating setting change is unnecessary and the wireless setting stored in the work area 58. The MFP 10 receives the print data by using the wireless LAN I/F 20 (S20). Upon receiving the print data, the MFP 10 causes the print executing unit 16 to execute the print process.

Moreover, in the sequence view of the present specification, the wireless communication executed by the MFP 10 by using the NFC I/F 22 (i.e., wireless communication according to the NFC system), and the wireless communication executed by the MFP 10 by using the wireless LAN I/F 20 (i.e., wireless communication according to the WFD system or normal Wi-Fi) is represented by arrows. The arrows representing the wireless communication using the wireless LAN I/F 20 are fatter than the arrows representing the wireless communication using the NFC I/F 22.

According to this configuration, in the case where the MFP 10 determines that the mobile device 50 currently belongs to the network to which the MFP 10 currently belongs, the MFP 10 can appropriately execute the communication of print data via the network to which the MFP 10 and the mobile device 50 currently belong without changing the wireless setting to which the MFP 10 and the mobile device 50 are currently set.

(Second Situation)

Figure 4:
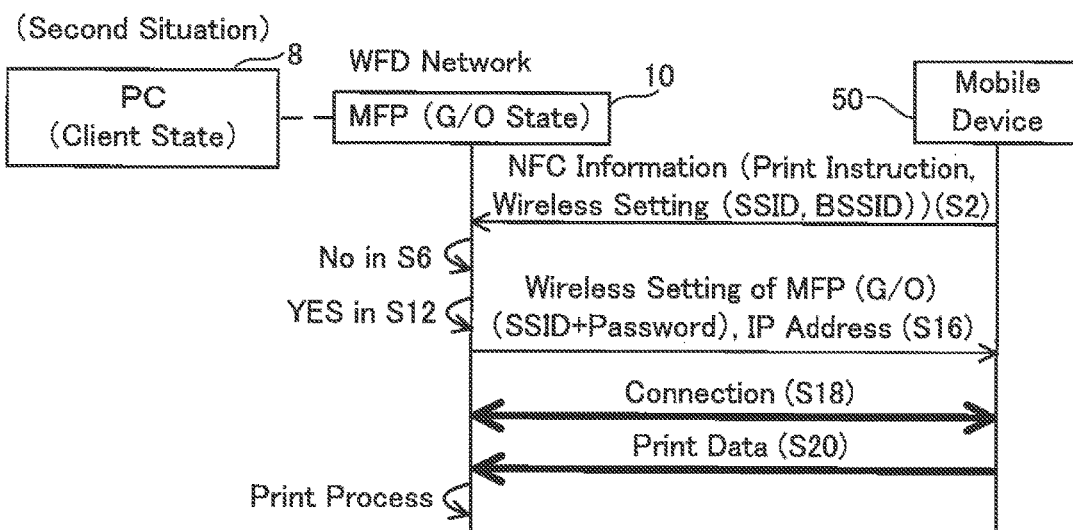
FIG. 4 shows a sequence view for explaining processes executed by devices in a second situation.

In the second situation shown in FIG. 4, the MFP 10 currently belongs to the WFD network. The MFP 10 is operating in the G/O state in the WFD network. The PC 8 that is in the client state currently belongs to the WFD network. The mobile device 50 does not currently belong to the wireless network to which the MFP 10 currently belongs. The mobile device 50 may currently belong, or may not belong, to a wireless network other than the wireless network to which the MFP 10 currently belongs.

In this situation, upon receiving the NFC information from the mobile device 50 by using the NFC I/F 22, the MFP 10 determines in S6 that the mobile device 50 does not currently belong to the WFD network to which the MFP 10 currently belongs (NO in S6). Moreover, in the case where the mobile device 50 currently belongs to a wireless network, the NFC information includes the SSID and BSSID of the wireless network. However, in the case where the mobile device 50 does not currently belong to a wireless network, the NFC information does not include the SSID and BSSID of a wireless network. In S12, the MFP 10 determines that the MFP 10 is in the G/O state (YES in S12). In this case, in S16, the MFP 10 sends the wireless setting of the MFP 10 stored in the work area 38 and the IP address of the MFP 10 to the mobile device 50 by using the NFC I/F 22. Upon receiving the wireless setting, the mobile device 50 stores the received wireless setting in the work area 58. Next, the MFP 10 and the mobile device 50 establish a WFD connection (S18). Thereby, the mobile device 50 can belong to the WFD network to which the MFP 10 currently belongs. Moreover, by using the NFC I/F 22, the MFP 10 sends a wireless setting including the authentication method and the encryption method of the MFP 10 to the mobile device 50. According to this configuration, the mobile device 50 can execute an authentication process according to the authentication method and encryption method received from the MFP 10, and need not execute any process to verify whether an authentication method and encryption method is to be used. Consequently, the MFP 10 and the mobile device 50 can establish a connection comparatively promptly.

Next, the mobile device 50 sends print data to the MFP 10 by using the wireless setting stored in the work area 58 and the IP address received in S16. The MFP 10 receives the print data by using the wireless LAN I/F 20 (S20). Upon receiving the print data, the MFP 10 causes the print executing unit 16 to execute a print process. According to this configuration, in the case where the MFP 10 is operating in the G/O state in the WFD network, the MFP 10 can appropriately execute the communication of print data with the mobile device 50 via the WFD network to which the MFP 10 currently belongs.

(Third Situation)

Figure 5:
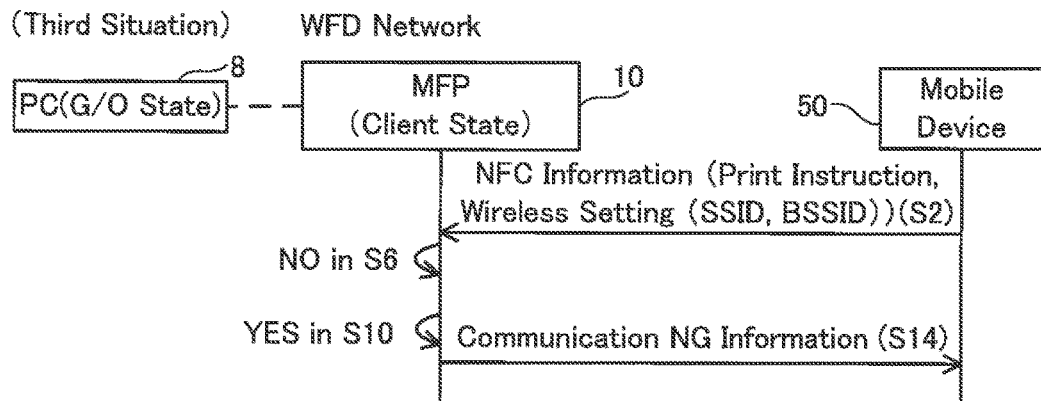
FIG. 5 shows a sequence view for explaining processes executed by devices in a third situation.

In the third situation shown in FIG. 5, the MFP 10 currently belongs to the WFD network. The MFP 10 is operating in the client state in the WFD network. The PC 8 that is in the G/O state currently belongs to the WFD network, whereas the mobile device 50 does not currently belong. The mobile device 50 is in the same state as in the second situation.

In this situation, upon receiving NFC information from the mobile device 50 by using the NFC I/F 22, the MFP 10 determines in S6 that the mobile device 50 does not currently belong to the WFD network to which the MFP 10 currently belongs (NO in S6). In S10 the MFP 10 determines that the MFP 10 is in the client state (YES in S10). In this case, in S14 the MFP 10 sends the communication NG information to the mobile device 50 by using the NFC I/F 22.

In this case, the MFP 10 does not send the wireless setting stored in the work area 38 to the mobile device 50. According to this configuration, the wireless setting of the PC 8 that is operating in the G/O state in the WFD network does not need to be provided to the mobile device 50. Thereby, it is possible to prevent the mobile device 50 from entering the WFD network. Further, by receiving the communication NG information from the MFP 10, the mobile device 50 can notify the user of the mobile device 50 that the MFP 10 is not executing the communication of object data with the mobile device 50.

(Fourth Situation)

Figure 6:
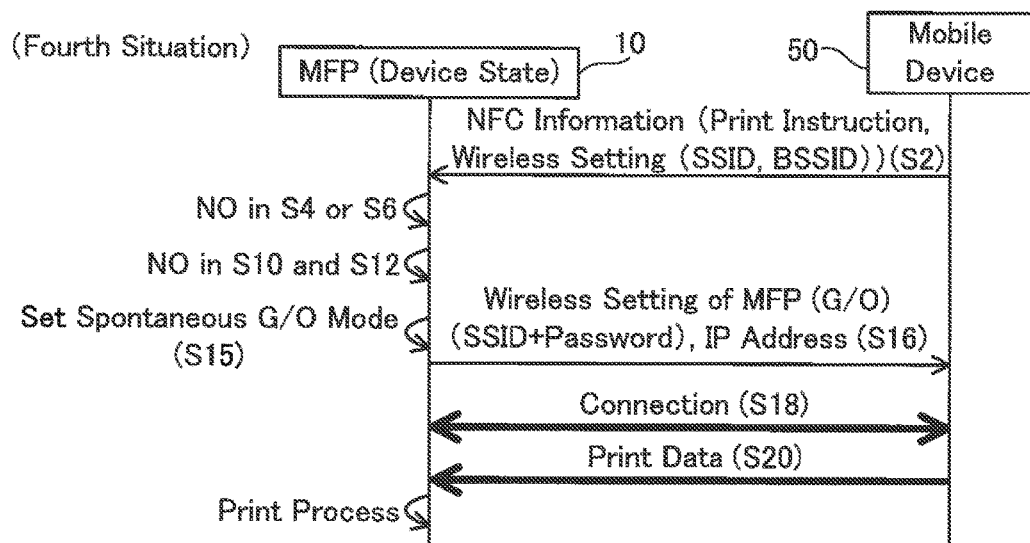
FIG. 6 shows a sequence view for explaining processes executed by devices in a fourth situation.

In a fourth situation shown in FIG. 6, the MFP 10 is set to the WFD=ON mode, but does not currently belong to a WFD network. That is, the MFP 10 is operating in the device state. Moreover, the state of the MFP 10 is either a state of currently belonging or not currently belonging to a normal Wi-Fi network. The mobile device 50 is in the same state as in the second situation.

In this situation, upon receiving NFC information from the mobile device 50 by using the NFC I/F 22, the MFP 10 determines in S4 that the MFP 10 does not currently belong to a network (NO in S4: the case where the MFP 10 is in the state of not currently belonging to the normal Wi-Fi network), or the MFP 10 determines in S6 that the mobile device 50 does not currently belong to the normal Wi-Fi network to which the MFP 10 currently belongs (YES in S6: the MFP 10 is in a state of currently belonging to a normal Wi-Fi network). Further, in S10 and S12, the MFP 10 determines that the MFP 10 is not in either the G/O state or the client state (NO in both S10, S12). In this case, in S15 the MFP 10 sets the MFP 10 to spontaneous G/O mode without executing the G/O negotiation.

Next, in S16, the MFP 10 sends the wireless setting of the MFP 10 stored in the work area 38 (i.e., the wireless setting prepared at the stage of setting spontaneous G/O mode in S15) and the IP address of the MFP 10 to the mobile device 50 by using the NFC I/F 22. Upon receiving the wireless setting, the mobile device 50 stores the received wireless setting in the work area 58. Next, the MFP 10 and the mobile device 50 establish a WFD connection (S18). Thereby, the mobile device 50 can belong to the WFD network in which the MFP 10 is operating in the G/O state.

Next, the mobile device 50 sends print data to the MFP 10 by using the wireless setting stored in the work area 58 and the IP address received in S16. The MFP 10 receives the print data by using the wireless LAN I/F 20 (S20). Upon receiving the print data, the MFP 10 causes the print executing unit 16 to execute the print process. According to this configuration, the MFP 10 can newly construct a WFD network in which the MFP 10 is operating in the G/O state in the WFD network. Thereby, the MFP 10 can appropriately execute the communication of print data with the mobile device 50 via the newly constructed WFD network. Further, since the MFP 10 is necessarily operating in the G/O state in the newly constructed WFD network, the MFP 10 can determine an authentication method, etc. to be used in the WFD network.

(Fifth Situation)

Figure 7:
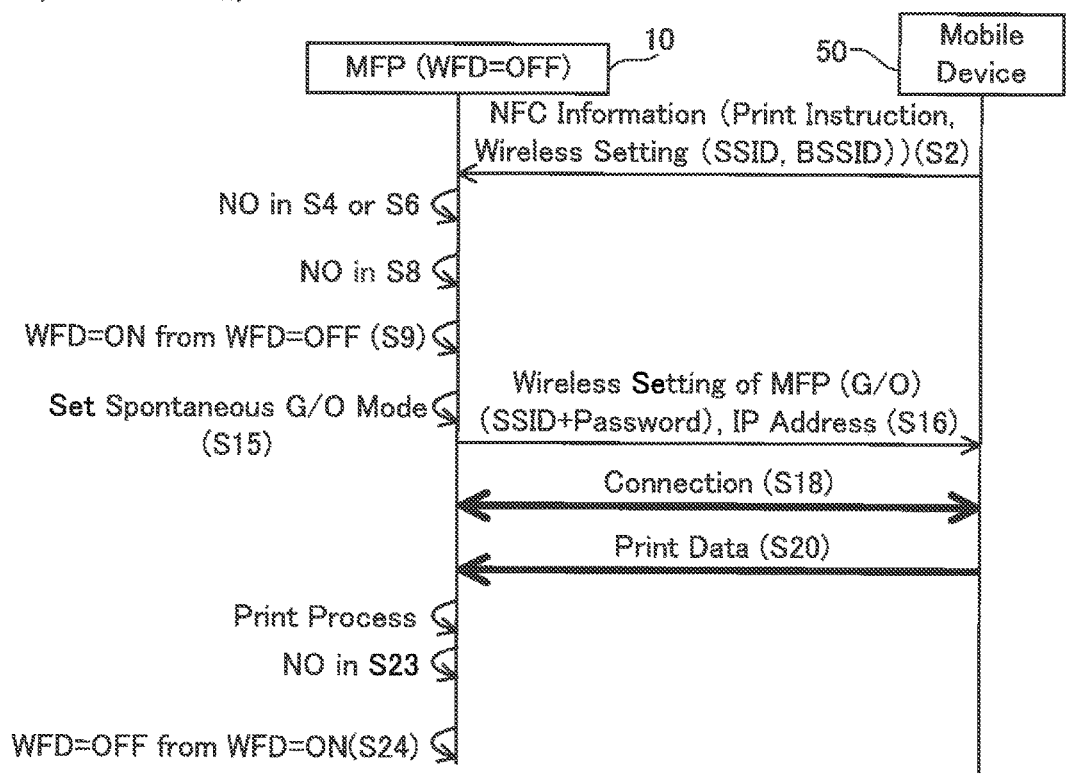
FIG. 7 shows a sequence view for explaining processes executed by devices in a fifth situation.

In the fifth situation shown in FIG. 7, the MFP 10 is set to the WFD=OFF mode. Moreover, the state of the MFP 10 is either the state of currently belonging or not currently belonging to the normal Wi-Fi network. The mobile device 50 is in the same state as in the second situation.

In this situation, upon receiving the NFC information from the mobile device 50 by using the NFC I/F 22, NO is determined in S4 or S6 in the same manner as in the fourth situation. The MFP 10 determines in S8 that the MFP 10 is set to the WFD=OFF mode. In this case, in S9 the MFP 10 changes the mode from the WFD=OFF mode to the WFD=ON mode. Next, in S15 the MFP 10 sets the MFP 10 to the spontaneous G/O mode.

Below, the processes until the print process are the same as in the fourth situation. In this configuration, also, the same advantages as in the fourth situation can be achieved. When the print process ends, the MFP 10 determines that an external device does not currently belong to the newly constructed WFD network (NO in S23), and changes the mode from the WFD=ON mode to the WFD=OFF mode. According to this configuration, in the case where the external device does not belong to the WFD network after the communication of print data, the mode can appropriately be changed from the WFD=ON mode to the WFD=OFF mode.

In the present embodiment, the MFP 10 can, by using the wireless LAN I/F 20, appropriately execute the wireless communication of object data with the mobile device 50 at a comparatively fast communication speed by executing processes in accordance with whether the MFP 10 currently belongs to the same network as the mobile device 50, i.e., in accordance with whether the MFP 10 is capable of communicating with the mobile device 50. Further, the MFP 10 can execute the communication of object data with the mobile device 50 via the WFD network without the MFP 10 and the mobile device 50 communicating via different access points.

Further, in the case where the MFP 10 is not capable of communicating with the mobile device 50 and the MFP 10 currently belongs to the WFD network, the MFP 10 can appropriately execute the communication of the object data with the mobile device 50 via the WFD network to which the MFP 10 currently belongs. Further, in the case where the MFP 10 does not currently belong to the WFD network, the MFP 10 can appropriately execute the communication of the object data with the mobile device 50 via the newly constructed WFD network.

(Corresponding Relationships)

The MFP 10 is an example of the "communication device", the NFC I/F 22 is an example of the "first type of interface", and the wireless LAN I/F 20 is an example of the "second type of interface". Moreover, from the above description, since the NFC I/F 22 (i.e., the "first type of interface") executes communication using the wireless LAN I/F 20 (i.e., the "second type of interface"), the NFC I/F 22 can be called an interface used for communication executed between the MFP 10 (i.e., the "communication device") and the mobile device 50.

The AP 6 is an example of the "access point". That is, the "access point" is a device that, within a network to which the access point belongs, i.e., a normal Wi-Fi network, relays communication between a pair of apparatuses belonging to the normal Wi-Fi network.

The NFC information is an example of the "specific information", and the SSID and BSSID included in the NFC information is the "wireless network identifier included in the specific information". The state of the mobile device 50 currently belonging to the network to which the MFP 10 currently belongs is the "communication-enabled state". The processes S15 to S18 are an example of the "specific process". Wireless communication via the WFD network by using the wireless LAN I/F 20 is an example of the "specific wireless communication". The G/O state is an example of the "parent station state", and the client state is an example of the "child station state". In the case where YES is determined in S4, the WFD network to which the MFP 10 belongs is an example of the "first wireless network", and the WFD network constructed by the processes S15 to S18 is an example of the "second wireless network". The communication NG information is an example of the "information indicating that the communication of object data is not executed". The WFD=ON mode is an example of the "first mode", and the WFD=OFF mode is an example of the "second mode".

Second Embodiment

Figure 8:
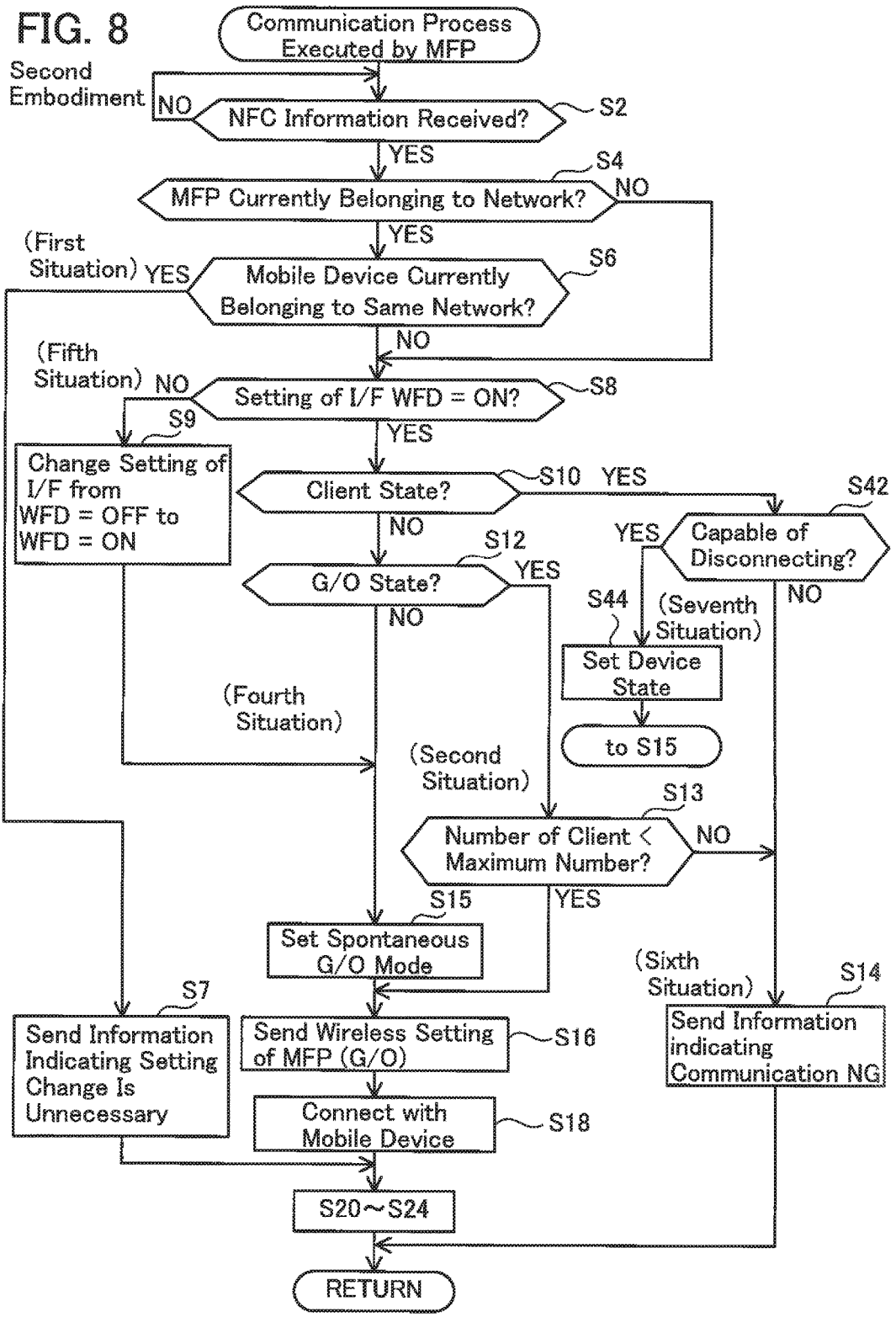
FIG. 8 shows a flowchart of a communication process executed by a multi-function peripheral of a second embodiment.

Points differing from the first embodiment will be described. In the present embodiment, a communication process of FIG. 8 is executed instead of the communication process of FIG. 2. S2 to S24 of FIG. 8 are the same as the processes S2 to S24 of FIG. 2. In the case of YES in S10, i.e., in the case where the MFP 10 currently belongs to the WFD network and is operating in the client state in the WFD network, in S42 the determining unit 42 determines whether the MFP 10 is capable of disconnecting from the WFD network to which it currently belongs. Specifically, in the case of either the situation where data communication is currently being executed via the WFD network or the situation where data communication is to be executed via the WFD network, the determining unit 42 determines that the MFP 10 is not capable of disconnecting from the WFD network to which it currently belongs (NO in S42). On the other hand, in the case of neither the situation where data communication is being executed via the WFD network nor the situation where data communication is to be executed, the determining unit 42 determines that the MFP 10 is capable of disconnecting from the WFD network to which it currently belongs (YES in S42).

For example, a case is assumed where the PC 8 is operating in the G/O state in a WFD network to which the MFP 10 currently belongs. In the case where the MFP 10 is currently receiving print data from the PC 8 by using the wireless LAN I/F 20, the determining unit 42 determines a situation where data communication is currently being executed. Further, in the case where the MFP 10 is creating scan data in accordance with a scan instruction from the PC 8 and, once the scan data is created, the MFP 10 is to send the scan data to the PC 8 by using the wireless LAN I/F 20, a situation where data communication is to be executed is determined.

In the case of NO in S42, the process proceeds to S14, and in the case of YES in S42, the process proceeds to S44. In S44, the communication executing unit 44 disconnects the MFP 10 from the WFD network to which the MFP 10 is currently joined. Specifically, the communication executing unit 44 deletes the wireless setting that is being stored in the work area 38, and changes the state value in the work area 38 to a value representing the device state. Next, the communication executing unit 44 executes the process S15.

Advantages of Present Embodiment

The MFP 10 of the second embodiment can achieve the same advantages as the MFP 10 of the first embodiment in the first, second, fourth, and fifth situations. The advantages of the present embodiment in sixth and seventh situations will be described with reference to FIGS. 9 and 10. Moreover, processes corresponding to the communication process of FIG. 8 are shown in each of FIGS. 9 and 10.

(Sixth Situation)

Figure 9:
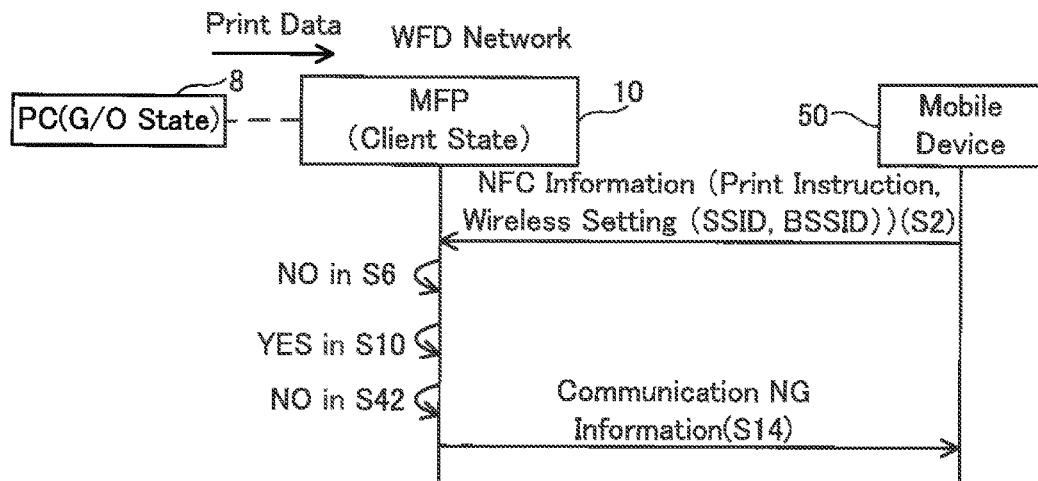
FIG. 9 shows a sequence view for explaining processes executed by devices in a sixth situation.

In the sixth situation shown in FIG. 9, the MFP 10 currently belongs to a WFD network. The MFP 10 is operating in the client state in the WFD network. The PC 8 that is in the G/O state currently belongs to the WFD network, but the mobile device 50 does not currently belong to the WFD network. The mobile device 50 is in the same state as in the second situation. Further, the MFP 10 is receiving print data from the PC 8.

In this situation, when NFC information is received from the mobile device 50 by using the NFC I/F 22, NO is determined in S6 and YES is determined in S10, as in the third situation. Since the MFP 10 is receiving print data from the PC 8, it is determined that the MFP 10 is not capable of disconnecting from the WFD network (NO in S42). In this case, in S14 the MFP 10 sends the communication NG information to the mobile device 50 via the NFC I/F 22.

According to this configuration, in the case where the MFP 10 is executing data communication via the WFD network to which the MFP 10 currently belongs, or in the case where the MFP 10 is to execute data communication via the WFD network to which the MFP 10 currently belongs, the MFP 10 can be prevented from disconnecting from the WFD network to which it currently belongs.

(Seventh Situation)

Figure 10:
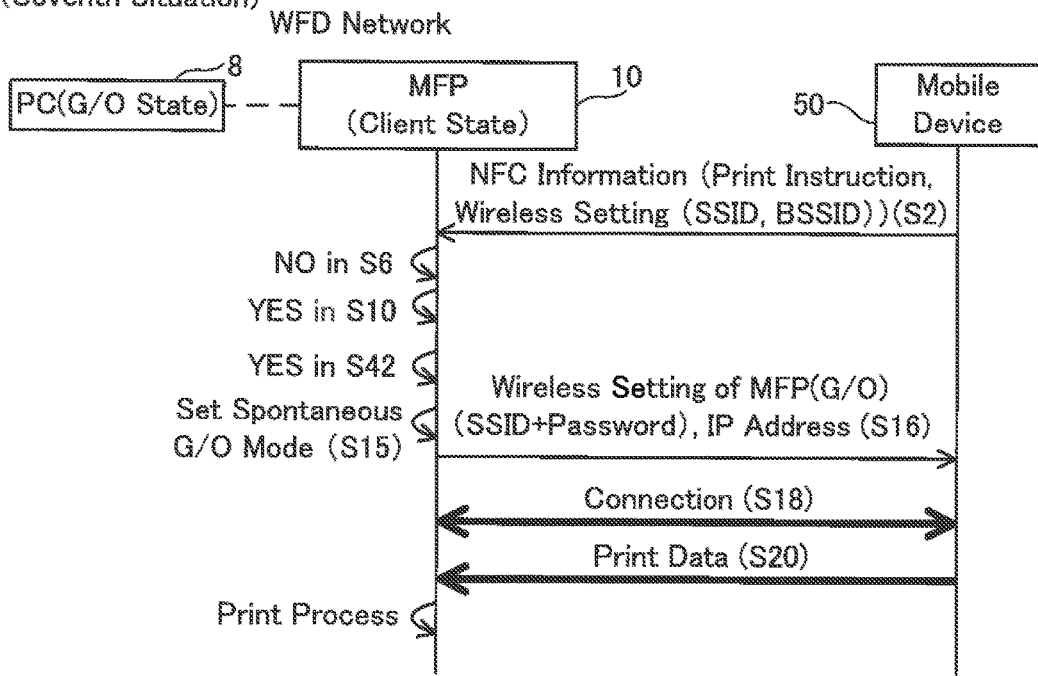
FIG. 10 shows a sequence view for explaining processes executed by devices in a seventh situation.

In the seventh situation shown in FIG. 10, the MFP 10 currently belongs to a WFD network. The MFP 10 is operating in the client state in the WFD network. The PC 8 that is in the G/O state currently belongs to the WFD network, but the mobile device 50 does not currently belong to the WFD network. However, the MFP 10 is not in the situation of currently executing the data communication with the PC 8, nor is in the situation where it is to execute the data communication with the PC 8. The mobile device 50 is in the same state as in the second situation.

In this situation, when NFC information is received from the mobile device 50 by using the NFC I/F 22, NO is determined in S6 and YES is determined in S10, as in the sixth situation. Since the MFP 10 is not in the situation of executing the data communication via the WFD network nor in the situation where it is to execute the data communication, it is determined that the MFP 10 is capable of disconnecting from the WFD network to which it currently belongs (YES in S42). In this case, in S15 the MFP 10 sets the MFP 10 to the spontaneous G/O mode. The subsequent processes are the same as the processes after the MFP 10 was set to the spontaneous G/O mode in the fourth situation.

According to this configuration, the MFP 10 disconnects from the WFD network in which the MFP 10 is operating in the client state, and can newly construct a WFD network. Thereby, the MFP 10 can appropriately execute the communication of object data with the mobile device 50 via the newly constructed WFD network.

(Corresponding Relationships)

The processes S42, S44 and the processes S15 to S18 of FIG. 8 are an example of the "specific process".

Third Embodiment

Figure 11:
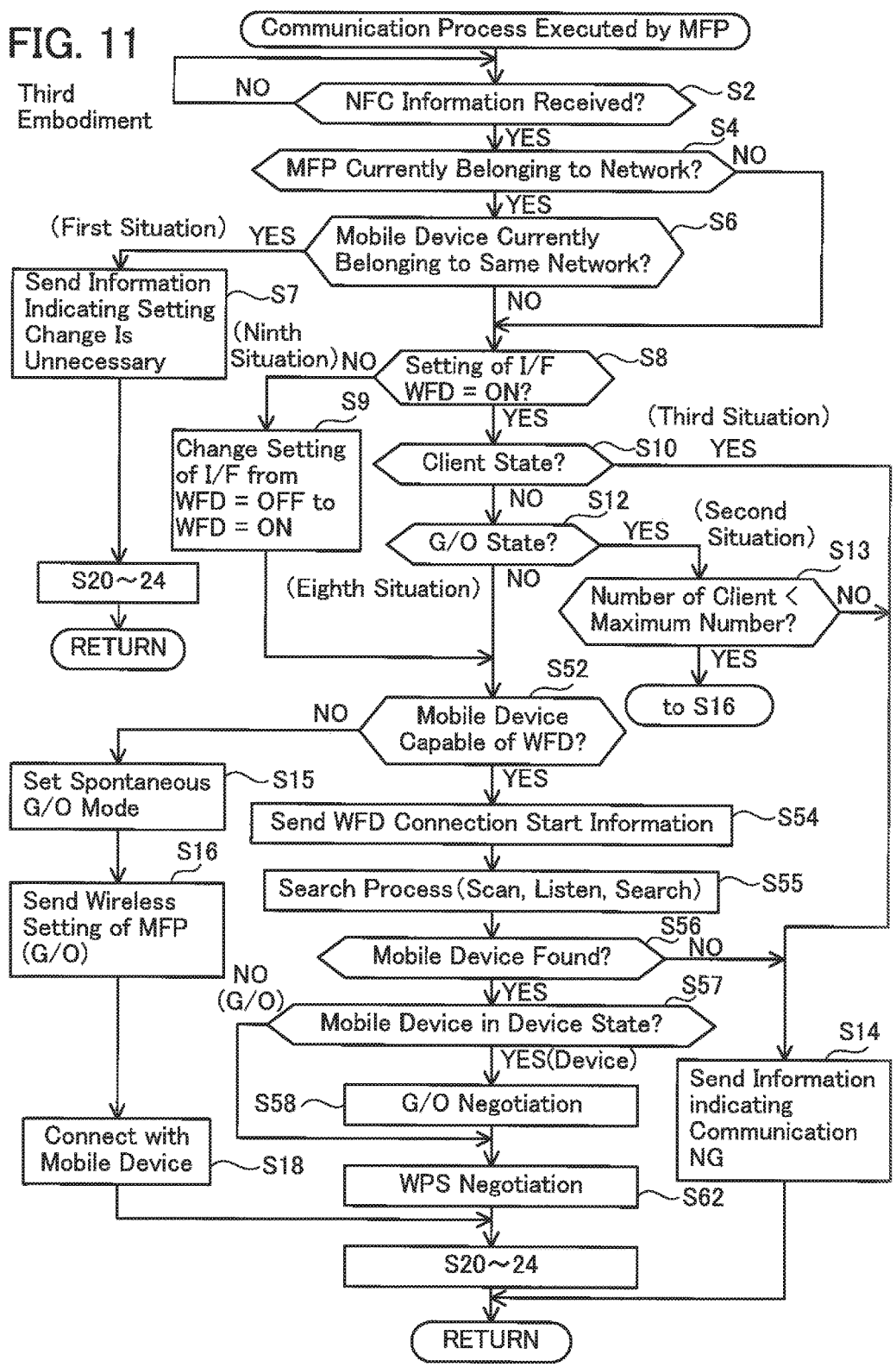
FIG. 11 shows a flowchart of a communication process executed by a multi-function peripheral of a third embodiment.

Points differing from the first embodiment will be described. In the present embodiment, a communication process of FIG. 11 is executed instead of the communication process of FIG. 2. Moreover, in the present embodiment, the mobile device 50 sends, to the MFP 10, NFC information further including WFD-compatible information, indicating whether the mobile device 50 is capable of executing wireless communication according to the WFD system, and device ID of the mobile device 50 (e.g., MAC address, serial number, etc.).

Figure 2:
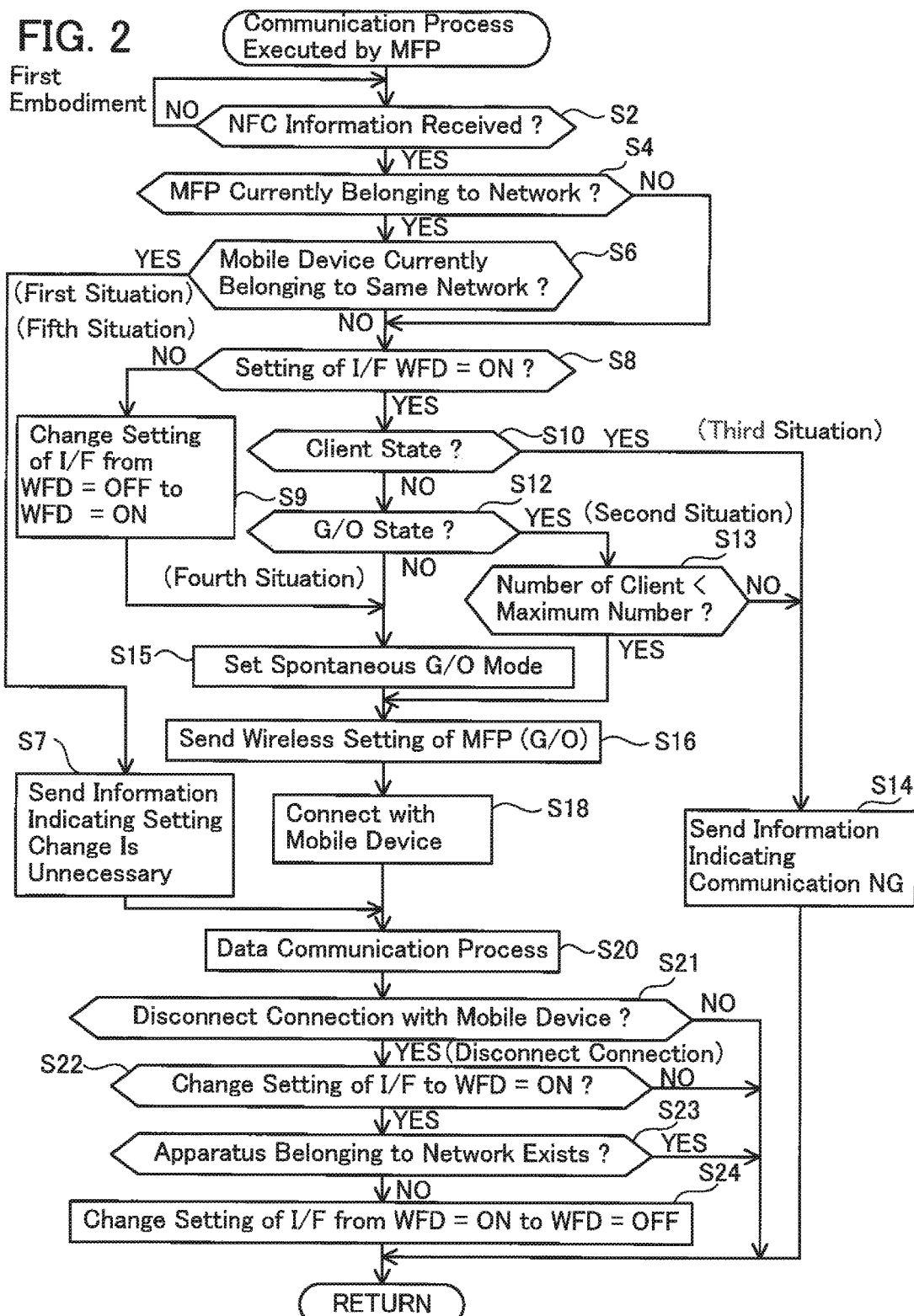
FIG. 2 shows a flowchart of a communication process executed by a multi-function peripheral of a first embodiment.

S2 to S24 of FIG. 11 are the same as the processes S4 to 24 of FIG. 2. In the case where the process S9 is executed, and in the case where NO is determined in S12, i.e., in the case where the MFP 10 is operating in the device state, the determining unit 42 determines in S52, by using the NFC information, whether the mobile device 50 is capable of executing wireless communication according to the WFD system. In the case where WFD-compatible information indicating that the mobile device 50 is capable of executing wireless communication according to the WFD system is included in the NFC information, the determining unit 42 determines that the mobile device 50 is capable of executing wireless communication according to the WFD system (YES in S52), and the process proceeds to S54.

On the other hand, in the case where WFD-compatible information indicating that the mobile device 50 is capable of executing wireless communication according to the WFD system is not included in the NFC information, the determining unit 42 determines that the mobile device 50 is not capable of executing wireless communication according to the WFD system (NO in S52), and the process proceeds to S15.

In S54 the communication executing unit 44 sends WFD connection start information indicating that the WFD connection is being started to the mobile device 50 via the NFC I/F 22. A WPS (abbreviation of: Wi-Fi Protected Setup) wireless connection system is used as a system for executing the WFD system wireless connection. WPS wireless connection systems include a PBC (abbreviation of: Push Button Configuration) system and a PIN (abbreviation of: Personal Identification Number) code system. In the present embodiment, the PBC code system will be described. However, the technique of the present embodiment can also be applied to the PIN code system. The WFD connection start information includes information indicating that the PBC code system is used as the system for executing the WFD system wireless connection. The WFD connection start information further includes a device ID of the MFP 10 (e.g., MAC address, serial number, etc.). Thereby, the mobile device 50 that receives the WFD connection start information can recognize an apparatus (i.e., the MFP 10) identified by the device ID included in the WFD connection start information, and that processes S58, S62 (to be described) are to be executed.

Upon receiving the WFD connection start information, the mobile device 50 determines whether the mobile device 50 is set so as to be capable of executing the wireless communication according to the WFD system. In the case of being set so as to be capable of executing the wireless communication according to the WFD system, the mobile device 50 maintains the wireless LAN I/F setting, and in the case of not being set so as to be capable of executing the wireless communication according to the WFD system, the mobile device 50 changes to a setting allowing it to be capable of executing the wireless communication according to the WFD system.

Next, in S55 the communication executing unit 44 searches for the mobile device 50. Specifically, the communication executing unit 44 sequentially executes a Scan process, a Listen process, and a Search process. The Scan process is a process for searching for a G/O state apparatus present in the surroundings of the MFP 10. Specifically, in the Scan process, the communication executing unit 44 wirelessly sends a Probe Request signal, sequentially, by using 13 channels 1ch to 13ch sequentially. Moreover, this Probe Request signal includes P2P (Peer 2 Peer) information indicating that the MFP 10 is capable of executing the WFD function.

For example, in the case where a G/O state WFD-compatible apparatus (called "specific G/O apparatus" below) is present in the surroundings of the MFP 10, it is predetermined that the specific G/O apparatus uses one channel from among 1ch to 13ch. Consequently, the specific G/O apparatus wirelessly receives a Probe Request signal from the MFP 10. In this case, the specific G/O apparatus wirelessly sends a Probe Response signal to the MFP 10. This Probe Response signal includes P2P information indicating that the specific G/O apparatus is capable of executing the WFD function, and information indicating that the specific G/O apparatus is in the G/O state. Consequently, the communication executing unit 44 can find the specific G/O apparatus. Moreover, the Probe Response signal further includes information indicating a device name of the specific G/O apparatus and a category (e.g., mobile device, PC, etc.) of the specific G/O apparatus, and a MAC address of the specific G/O apparatus. Consequently, the communication executing unit 44 can acquire information related to the specific G/O apparatus.

In the case where the device ID of the specific G/O apparatus included in the Probe Response signal and the device ID of the mobile device 50 included in the NFC information are identical, the communication executing unit 44 can identify that the specific G/O apparatus is the mobile device 50. That is, in the case where the mobile device 50 currently belongs to the WFD network and the mobile device 50 is operating in the G/O state in the WFD network, the communication executing unit 44 can find the mobile device 50 by means of the Scan process.

Moreover, for example, in the case where a device state WFD-compatible apparatus (called "specific device apparatus" below) is present in the surroundings of the MFP 10, it is predetermined that the specific device apparatus uses one channel from among 1ch, 6ch, and 11ch. Consequently, the specific device apparatus also wirelessly receives a Probe Request signal from the MFP 10. In this case, the specific device apparatus wirelessly sends a Probe Response signal to the MFP 10. However, this Probe Response signal includes information indicating that the specific device apparatus is in the device state, and does not include information indicating that the specific device apparatus is in the G/O state. Further, even if an apparatus that is in the client state wirelessly receives the Probe Request signal from the MFP 10, the client state apparatus does not wirelessly send the Probe Response signal to the MFP 10. Consequently, in the Scan process, the communication executing unit 44 can find the mobile device 50 in either the G/O state or the device state.

The Listen process is a process for responding to the Probe Request signal. The specific device apparatus can wirelessly send the Probe Request signal during the Search process (to be described). That is, in the case where the current state of the mobile device 50 is the device state, the mobile device 50 periodically sends the Probe Request signal wirelessly. This Probe Request signal includes the device ID of the mobile device 50 (e.g., MAC address, serial number, etc.).

In the case where the device ID of the specific device apparatus included in the Probe Request signal and the device ID of the mobile device 50 included in the NFC information are identical, the communication executing unit 44 can identify that the specific device apparatus is the mobile device 50. That is, in the case where the mobile device 50 is operating in the device state, the communication executing unit 44 can find the mobile device 50 by means of the Listen process. Upon receiving the Probe Request signal from the mobile device 50, the communication executing unit 44 wirelessly sends a Probe Response signal.

In the Search process, the communication executing unit 44 sequentially uses the three channels 1ch, 6ch, 11ch to sequentially send the Probe Request signal wirelessly. Thereby, the communication executing unit 44 wirelessly receives the Probe Response signal from the specific device apparatus. This Probe Response signal includes the P2P information indicating that the specific device apparatus is capable of executing the WFD function, information indicating that the specific device apparatus is in the device state, and the device ID of the specific device apparatus (e.g., MAC address, serial number, etc.). In the case where the current state of the mobile device 50 is the device state, the mobile device 50 wirelessly sends the Probe Response signal in response to the Probe Request signal sent from the MFP 10.

In the case where the device ID of the specific device apparatus included in the Probe Response signal and the device ID of the mobile device 50 included in the NFC information are identical, the communication executing unit 44 can identify that the specific device apparatus is the mobile device 50. That is, in the case where the mobile device 50 currently belongs to the WFD network and is operating in the device state in the WFD network, the communication executing unit 44 can find the mobile device 50 by means of the Search process.

In S55 the communication executing unit 44 can find the mobile device 50 (YES in S56) both in the case where the mobile device 50 is operating in the G/O state and in the case where the mobile device 50 is operating in the device state. In the case where the mobile device 50 was not found in S56 (NO in S56), the process proceeds to S14.

In the case where the mobile device 50 is found (YES in S56), in S57 the communication executing unit 44 determines whether the found mobile device 50 is in the device state. Specifically, in the case where information indicating that the mobile device 50 is in the device state is received in the process S55, it is determined that the mobile device 50 is in the device state (YES in S57), and the process proceeds to S58. On the other hand, in the case where information indicating that the mobile device 50 is in the device state is not received in the process S55, it is determined that the mobile device 50 is not in the device state (i.e., the mobile device 50 is in the G/O state) (NO in S57), and the process proceeds to S62.

In S58, by using the wireless LAN I/F 20, the communication executing unit 44 executes the G/O negotiation with the mobile device 50, determining that one apparatus of the MFP 10 and the mobile device 50 is to operate in the G/O state and the other apparatus is to operate in the client state.

Specifically, the communication executing unit 44 first wirelessly sends a connection request signal to the mobile device 50. Consequently, the mobile device 50 also wirelessly sends an OK signal to the MFP 10. Next, the communication executing unit 44 wirelessly sends information indicating G/O priority of the MFP 10 to the mobile device 50, and receives information indicating G/O priority of the mobile device 50 from the mobile device 50. Moreover, the G/O priority of the MFP 10 is an index indicating the degree to which the MFP 10 should become the G/O, and is predetermined in the MFP 10. Similarly, the G/O priority of the mobile device 50 is an index indicating the degree to which the mobile device 50 should become the G/O. For example, an apparatus in which the capacity of the CPU and the memory is comparatively high (e.g. the MFP 10) can execute another process rapidly while operating as the G/O. Consequently, the G/O priority is usually set in this type of apparatus so that it has a high possibility of becoming the G/O. On the other hand, e.g., an apparatus in which the capacity of the CPU and the memory is comparatively low (e.g., the mobile device 50) might be unable to execute another process rapidly while operating as the G/O. Consequently, the G/O priority is usually set in this type of apparatus so that it has a low possibility of becoming the G/O.

The communication executing unit 44 compares the G/O priority of the MFP 10 and the G/O priority of the mobile device 50, and determines that the apparatus with high priority (the MFP 10 or the mobile device 50) is to operate in the G/O state, and the apparatus with low priority (the MFP 10 or the mobile device 50) is to operate in the client state. In the case of determining that the MFP 10 is to operate in the G/O state, the communication executing unit 44 changes the state value in the memory 34 from the value corresponding to the device state to the value corresponding to the G/O state. Consequently, the MFP 10 becomes able to operate in the G/O state. Further, in the case of determining that the MFP 10 is to operate in the client state, the communication executing unit 44 changes the state value in the memory 34 from the value corresponding to the device state to the value corresponding to the client state. Consequently, the MFP 10 becomes able to operate in the client state. Moreover, the G/O state and the client state of the mobile device 50 are determined based on the G/O priority of the MFP 10 and the G/O priority of a target apparatus by using the same method as the MFP 10. When the G/O negotiation of S58 ends, the process proceeds to S62.

In S62 the communication executing unit 44 establishes a connection between the MFP 10 and the mobile device 50 according to WPS. Specifically, the communication executing unit 44 determines whether the current state of the MFP 10 is the G/O state and the current state of the mobile device 50 is the client state or not. In the case where the current state of the MFP 10 is the G/O state and the current state of the mobile device 50 is the client state, the communication executing unit 44 executes WPS negotiation for the G/O state.

Specifically, the communication executing unit 44 creates the wireless setting needed to establish the wireless connection (SSID, authentication method, encryption method, password, etc.), and wirelessly sends it to the mobile device 50. Moreover, the authentication method and encryption method are predetermined. Further, the communication executing unit 44 creates a password at the time of creating the wireless setting. Moreover, the SSID may be created by the communication executing unit 44, or may be predetermined. Sending the wireless setting to the mobile device 50 allows the MFP 10 and the mobile device 50 to use the same wireless setting. That is, by using the wireless setting, the MFP 10 and the mobile device 50 execute the wireless communication of an Authentication Request, Authentication Response, Association Request, Association Response, and 4way handshake. Various authentication processes such as authentication of the SSID, authentication of the authentication method and encryption method, authentication of the password, etc. are executed during this process. In a case where all the authentications succeed, a wireless connection is established between the MFP 10 and the mobile device 50. Thereby, the state is achieved where the MFP 10 and the mobile device 50 belong to the same WFD network.

On the other hand, in the case where the current state of the MFP 10 is the client state and the current state of the target apparatus is the G/O state, the communication executing unit 44 executes the WPS negotiation for the client state. Specifically, the mobile device 50 creates the wireless setting needed to establish the wireless connection (SSID, authentication method, encryption method, password, etc.), and wirelessly sends it to the MFP 10. Consequently, the communication executing unit 44 wirelessly receives the wireless setting from the mobile device 50. The subsequent processes (the communication processes of the Authentication Request, etc.) are the same as in the WPS negotiation for the G/O state. Thereby, a state is achieved where the MFP 10 and the mobile device 50 belong to the same WFD network. Consequently, it becomes possible to execute the wireless communication of object data (print data, etc.) between the MFP 10 that is in the client state and the mobile device 50 that is in the G/O state. When S62 ends, the control unit 30 executes the processes S20 to S24 of FIG. 2, ending the communication process.

Advantages of Present Embodiment

The MFP 10 of the third embodiment can achieve the same advantages as the MFP 10 of the first embodiment in the first to third situations. The advantages of the present embodiment in eighth and ninth situations will be described with reference to FIGS. 12, 13. Moreover, processes corresponding to the communication process of FIG. 11 are shown in each of FIGS. 12, 13.

(Eighth Situation)

Figure 12:
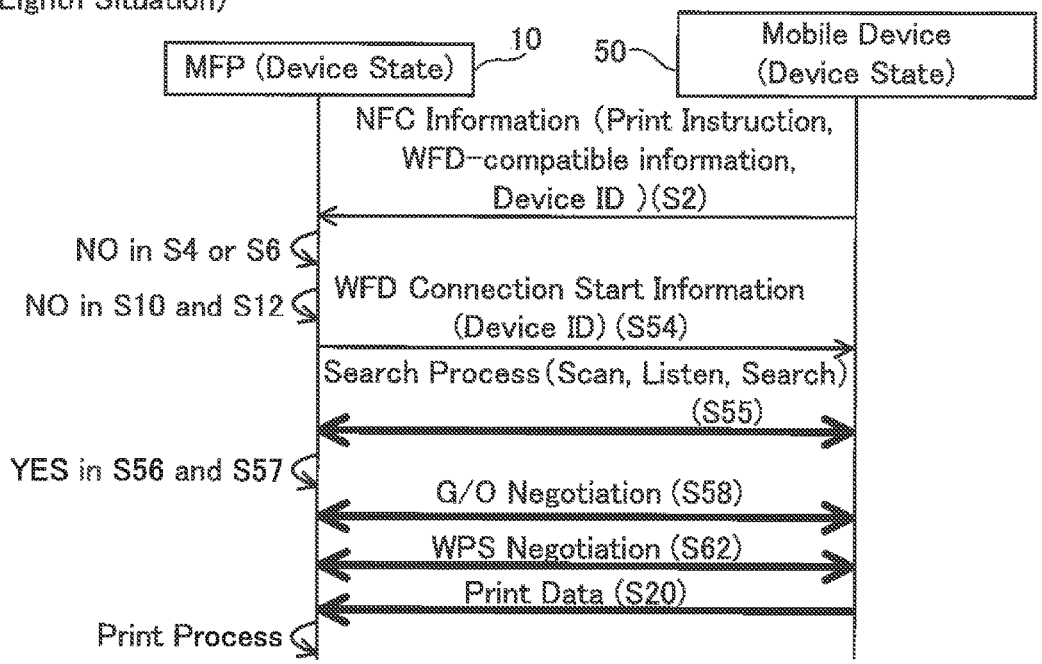
FIG. 12 shows a sequence view for explaining processes executed by devices in an eighth situation.

In the eighth situation shown in FIG. 12, the MFP 10 is set to the WFD=ON mode, but does not currently belong to the WFD network. That is, the MFP 10 is operating in the device state. Moreover, the state of the MFP 10 is either the state of currently belonging or not currently belonging to the normal Wi-Fi network. The mobile device 50 does not currently belong to a wireless network.

In this situation, upon receiving NFC information from the mobile device 50 by using the NFC I/F 22, the MFP 10 determines NO in S4 or S6, and determines NO in S10 and S12, as in the fourth situation.

The MFP 10 sends the WFD connection start information to the mobile device 50 by using the wireless LAN I/F 20 (S54). Next, the MFP 10 executes the Search process of S55, searching for the mobile device 50. Upon finding the mobile device 50 (YES in S56), the MFP 10 determines whether the found mobile device 50 is in the device state (S57). In the case of determining that the mobile device 50 is in the device state (YES in S57), the G/O negotiation (S58) and the WPS negotiation (S62) are executed by using the wireless LAN I/F 20. Thereby, the WFD network is constructed to which the MFP 10 and the mobile device 50 belong.

Next, the mobile device 50 sends print data to the MFP 10. The MFP 10 receives the print data by using the wireless LAN I/F 20 (S20). Upon receiving the print data, the MFP 10 causes the print executing unit 16 to execute the print process.

(Ninth Situation)

Figure 13:
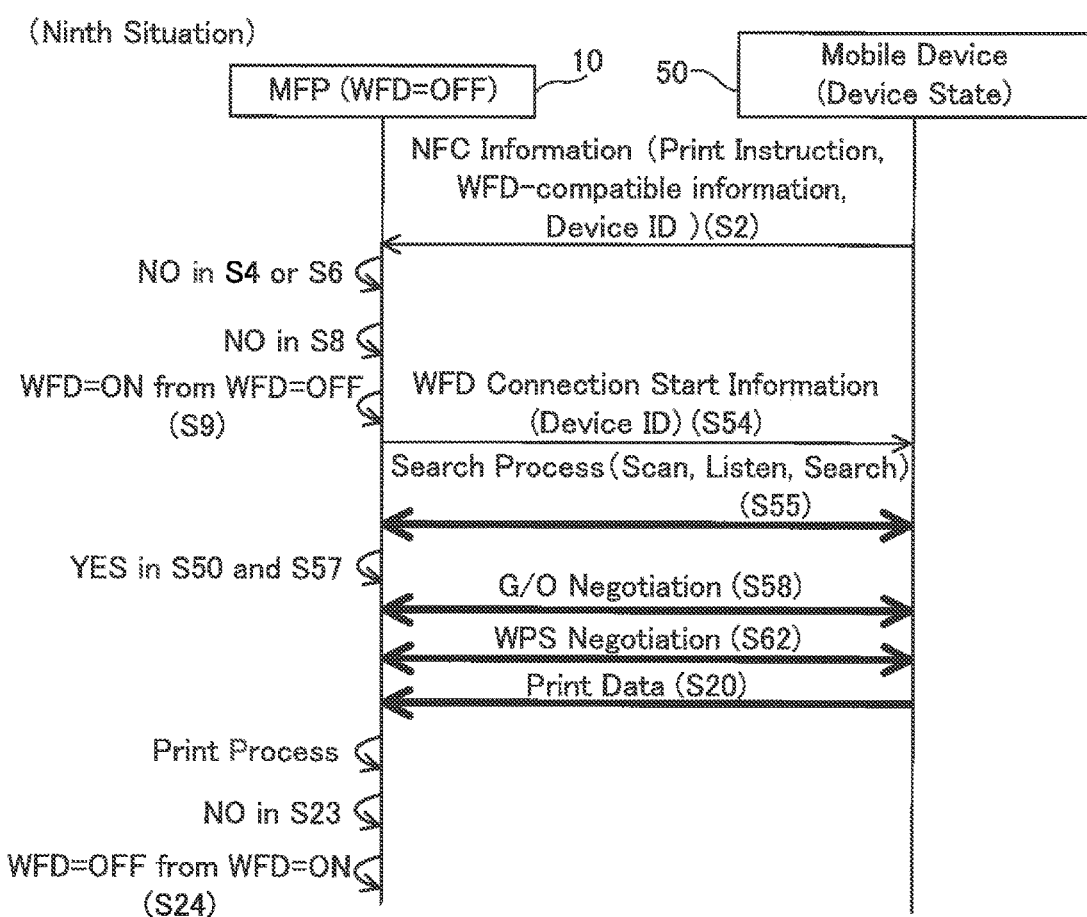
FIG. 13 shows a sequence view for explaining processes executed by devices in a ninth situation.

In the ninth situation of FIG. 13, the MFP 10 is set to the WFD=OFF mode. Moreover, the state of the MFP 10 is either a state of currently belonging or not currently belonging to the normal Wi-Fi network. The mobile device 50 does not currently belong to the wireless network.

In this situation, upon receiving NFC information from the mobile device 50 by using the NFC I/F 22, the MFP 10 determines NO in S4 or S6, and determines NO in S8, as in the fifth situation. In this case, in S9 the MFP 10 changes from the WFD=OFF mode to the WFD=ON mode.

After changing from the WFD=OFF mode to the WFD=ON mode, the processes executed until the print process are the same as the processes executed until the print process in the eighth situation after NO was determined in S10 and S12. When the print process ends, the MFP 10 determines that an external device does not currently belong to the newly constructed WFD network (NO in S23), and changes from the WFD=ON mode to the WFD=OFF mode. According to this configuration, in the case where the external device does not belong to the WFD network after the communication of print data, the mode can change appropriately from the WFD=ON mode to the WFD=OFF mode.

According to this configuration, the MFP 10 can construct, with the mobile device 50, the WFD network operating in either the G/O state or the client state. Thereby, the MFP 10 can appropriately execute the communication of the print data with the mobile device 50.

(Corresponding Relationships)

The processes S15 to S18 and the processes S52 to S62 of FIG. 11 are an example of the "specific process".

Fourth Embodiment

Figure 14:
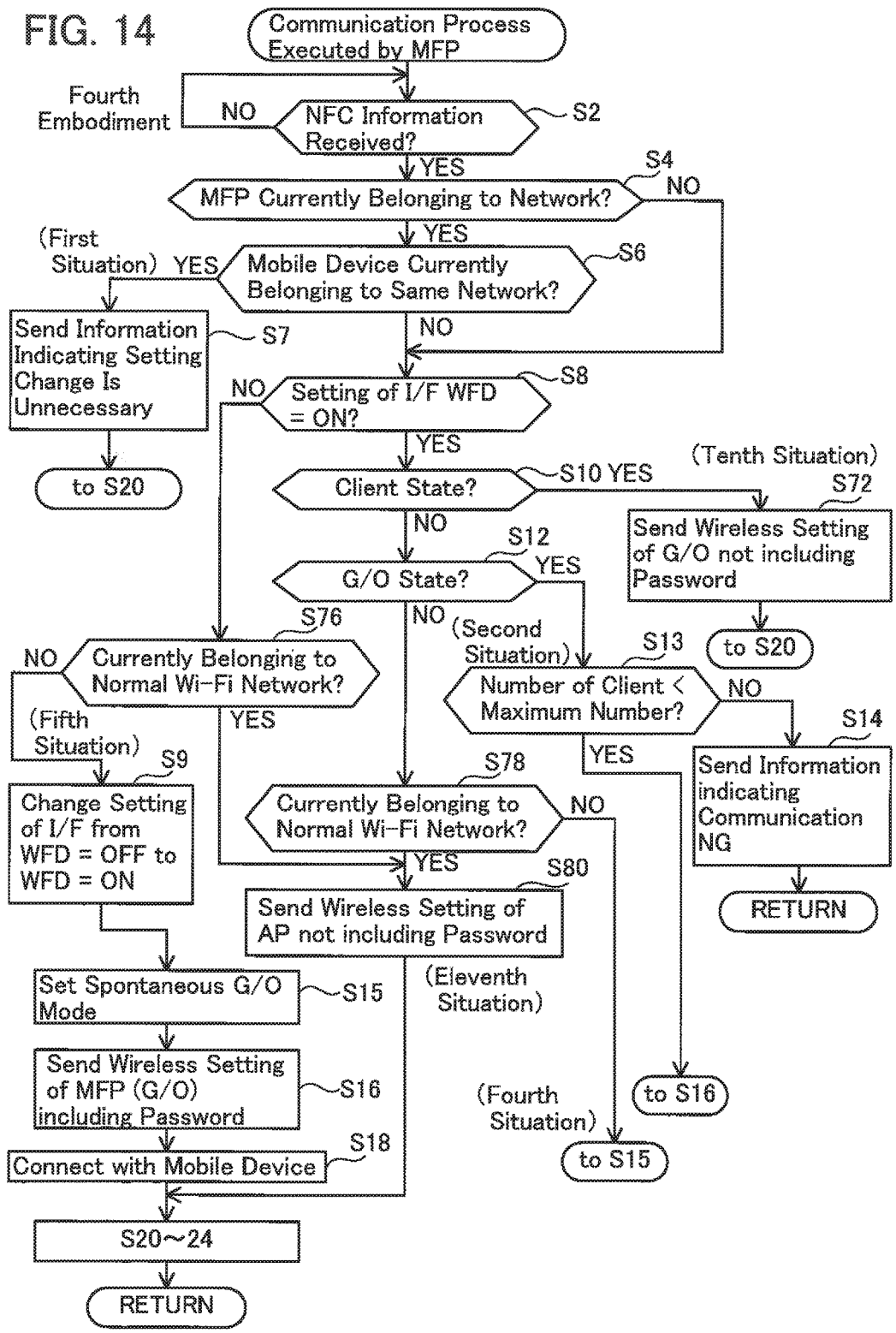
FIG. 14 shows a flowchart of a communication process executed by a multi-function peripheral of a fourth embodiment.

Points differing from the first embodiment will be described. In the present embodiment, a communication process of FIG. 14 is executed instead of the communication process of FIG. 2. S2 to S24 of FIG. 14 are the same as the processes S2 to S24 of FIG. 2. In the case of NO in S8, i.e., in the case where the MFP 10 is not set to the WFD=ON mode, in S76 the determining unit 42 determines whether the MFP 10 currently belongs to the normal Wi-Fi network. In the case where information indicating that the MFP 10 currently belongs to the normal Wi-Fi network is being stored in the work area 38, the determining unit 42 determines that the MFP 10 currently belongs to the normal Wi-Fi network (YES in S76), and the process proceeds to S80. On the other hand, in the case where information indicating that the MFP 10 currently belongs to the normal Wi-Fi network is not being stored in the work area 38, the determining unit 42 determines that the MFP 10 does not currently belong to the normal Wi-Fi network (NO in S76), and the process proceeds to S9.

In the case of YES in S10, i.e., in the case where the MFP 10 currently belongs to a WFD network and is operating in the client state in the WFD network, in S72 the communication executing unit 44 sends the G/O wireless setting without including the password, that is being stored in the work area 38 to the mobile device 50 via the NFC I/F 22, and the process proceeds to S20.

Upon receiving the G/O wireless setting, the mobile device 50 causes the user to specify a password. When a password has been specified by the user, the mobile device 50 establishes the connection with the G/O state device by using the wireless setting received from the MFP 10 and the password specified by the user. Thereby, the mobile device 50 becomes capable of wireless communication with the MFP 10 via the G/O state device. Moreover, in the case where the connection cannot be established between the mobile device 50 and the G/O state device, the MFP 10 cannot execute wireless communication with the mobile device 50. In this case, the control unit 30 returns to S2 without executing the processes S20 to S24.

In the case of YES in S12, i.e., in the case where the MFP 10 currently belongs to a WFD network and is operating in the G/O state in the WFD network, the process proceeds to S13. In S16 the communication executing unit 44 sends the wireless setting of the MFP 10 stored in the work area 38 to the mobile device 50 via the NFC I/F 22, and the process proceeds to S18. The wireless setting of the MFP 10 sent in S16 includes the password.

Further, in the case where NO is determined in S12, i.e., in the case where the MFP 10 is operating in the device state, the determining unit 42 executes the process S78. The process S78 is the same as the process S76. In the case of NO in S78, the process proceeds to S15, and in the case of YES in S78, the process proceeds to S80.

In S80, the communication executing unit 44 sends the wireless setting not including the password, for belonging to the normal Wi-Fi network that is being stored in the work area 38, i.e., the wireless setting of the AP (e.g., the AP 6) to the mobile device 50 via the NFC I/F 22, and the process proceeds to S20. Upon receiving the AP wireless setting, as in the case of S72, the mobile device 50 establishes a connection with the AP by using the wireless setting received from the MFP 10 and the password specified by the user. Thereby, the mobile device 50 becomes capable of wireless communication with the MFP 10 via the AP. Moreover, in the case where a connection cannot be established between the mobile device 50 and the AP, the MFP 10 cannot execute wireless communication with the mobile device 50. In this case, the control unit 30 returns to S2 without executing the processes S20 to S24.

Advantages of Present Embodiment

The MFP 10 of the fourth embodiment can achieve the same advantages as the MFP 10 of the first embodiment in the first, second, fourth and fifth situations. The advantages of the present embodiment in tenth and eleventh situations will be described with reference to FIGS. 15, 16. Moreover, processes corresponding to the communication process of FIG. 14 are shown in each of FIGS. 15, 16.

(Tenth Situation)

Figure 15:
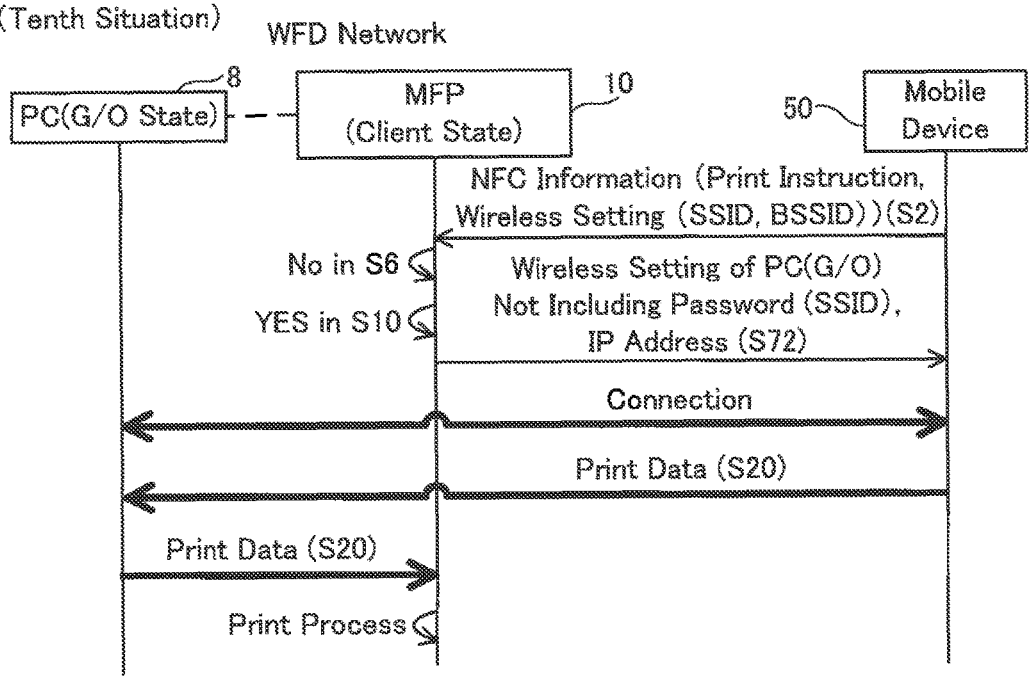
FIG. 15 shows a sequence view for explaining processes executed by devices in a tenth situation.

In the tenth situation shown in FIG. 15, the MFP 10 currently belongs to the WFD network. The MFP 10 is operating in the client state in the WFD network. The PC 8 that is in the G/O state currently belongs to the WFD network, but the mobile device 50 does not currently belong to the WFD network. The mobile device 50 is in the same state as in the second situation.

In this situation, upon receiving NFC information from the mobile device 50 by using the NFC I/F 22, the MFP 10 determines NO in S6 and determines YES in S10, as in the third situation. In S72, the MFP 10 sends the IP address of the MFP 10 and the wireless setting not including the password, of the PC 8 that is operating in the G/O state to the mobile device 50 via the NFC I/F 22. According to this configuration, a password does not need to be provided to the mobile device 50 and the user. Consequently, in the case where the mobile device 50 and the user do not know the password for belonging to the WFD network in which the PC 8 is operating in the G/O state, it is possible to prevent the mobile device 50 from entering the WFD network.

Upon receiving the wireless setting, the mobile device 50 stores the received wireless setting in the work area 58. Next, the mobile device 50 displays a password specifying screen on a displaying unit of the mobile device 50. The user can specify the password by operating the control unit of the mobile device 50. When the password is specified by the user, the mobile device 50 establishes the WFD connection with the PC 8. Thereby, the mobile device 50 can belong to the WFD network to which the MFP 10 currently belongs. The mobile device 50 operates in the client state in the WFD network.

Moreover, in a modification, the wireless setting used previously to belong to the network may be stored by the mobile device 50 in the memory of the mobile device 50. In this case, upon receiving the wireless setting that does not include the password, the mobile device 50 may identify, from the memory of the mobile device 50, the wireless setting that includes the same SSID as the SSID included in the received wireless setting. The mobile device 50 may establish the WFD connection with the PC 8 by using the wireless setting identified from the memory of the mobile device 50.

Upon belonging to the WFD network, the mobile device 50 sends print data to the MFP 10 by executing wireless communication via the PC 8 by using the wireless setting stored in the work area 58 and the IP address of the MFP 10 received in S72. The MFP 10 receives the print data from the PC 8 by using the wireless LAN I/F 20 (S20) and, upon receiving the print data, causes the print executing unit 16 to execute the print process.

According to this configuration, in the case where the MFP 10 does not belong to the same network as the mobile device 50, the MFP 10 can appropriately execute the communication of print data with the mobile device 50 via the WFD network to which the MFP 10 currently belongs.

(Eleventh Situation)

Figure 16:
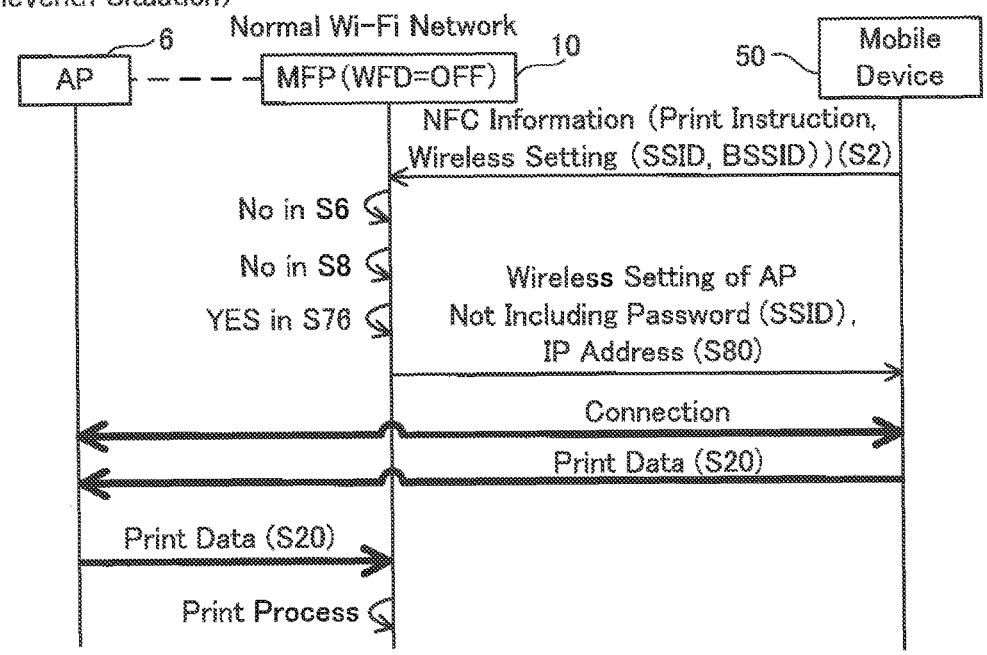
FIG. 16 shows a sequence view for explaining processes executed by devices in an eleventh situation.

In the eleventh situation shown in FIG. 16, the MFP 10 currently belongs to a normal Wi-Fi network. The MFP 10 is connected with the AP 6 in the normal Wi-Fi network. The mobile device 50 is in the same state as in the second situation.

In this situation, upon receiving NFC information from the mobile device 50 by using the NFC I/F 22, in S6 the MFP 10 determines that the mobile device 50 does not currently belong to the normal Wi-Fi network to which the MFP 10 currently belongs (NO in S6). Further, in S8 the MFP 10 determines that it is set to WFD=OFF mode (NO in S8). Next, in S76 the MFP 10 determines that it currently belongs to the normal Wi-Fi network (YES in S76). In this case, in S80 the MFP 10 sends, to the mobile device 50, the IP address of the MFP 10 and the wireless setting of the AP 6 not including the password, which is stored in the work area 38. According to this configuration, the password does not need to be provided to the mobile device 50 and the user. Consequently, in the case where the mobile device 50 and the user do not know the password for belonging to the normal Wi-Fi network in which the AP 6 is used, it is possible to prevent the mobile device 50 from entering the normal Wi-Fi network.

When the wireless setting is received, as in the tenth situation, the mobile device 50 receives the wireless setting and causes the user to specify the password. Next, when the password is specified by the user, the mobile device 50 establishes a normal Wi-Fi connection with the AP 6. Thereby, the mobile device 50 can belong to the normal Wi-Fi network to which the MFP 10 currently belongs. The mobile device 50 can send the print data to the MFP 10 via the AP 6. Upon belonging to the normal Wi-Fi network, the mobile device 50 executes the wireless communication via the AP 6 by using the wireless setting stored in the work area 58 and the IP address of the MFP 10 received in S80, thereby sending the print data to the MFP 10.

Moreover, although not shown, in the case where the MFP 10 is currently operating in the device state (YES in S8, NO in S10 and S12) and the MFP 10 belongs to the normal Wi-Fi network (YES in S78), as well, the MFP 10 sends, to the mobile device 50, the AP wireless setting not including the password, that is being stored in the work area 38.

According to this configuration, in the case where the MFP 10 does not belong to the same network as the mobile device 50, the MFP 10 can appropriately execute the communication of the print data with the mobile device 50 via the normal Wi-Fi network to which the MFP 10 currently belongs.

(Corresponding Relationships)

The processes S15 to S18, the process S72, the processes S7 to S18, and the process S80 of FIG. 14 are an example of the "specific process". In the case where YES is determined in S4 of FIG. 14, the WFD network and the normal Wi-Fi network to which the MFP 10 belongs are an example of the "first wireless network".

Fifth Embodiment

Points differing from the first embodiment will be described. In the present embodiment, in the case where the mobile device 50 currently belongs to a network, the mobile device 50 sends, to the MFP 10, NFC information further including the password, authentication method and encryption method as the wireless setting stored in the work area 58.

Figure 17:
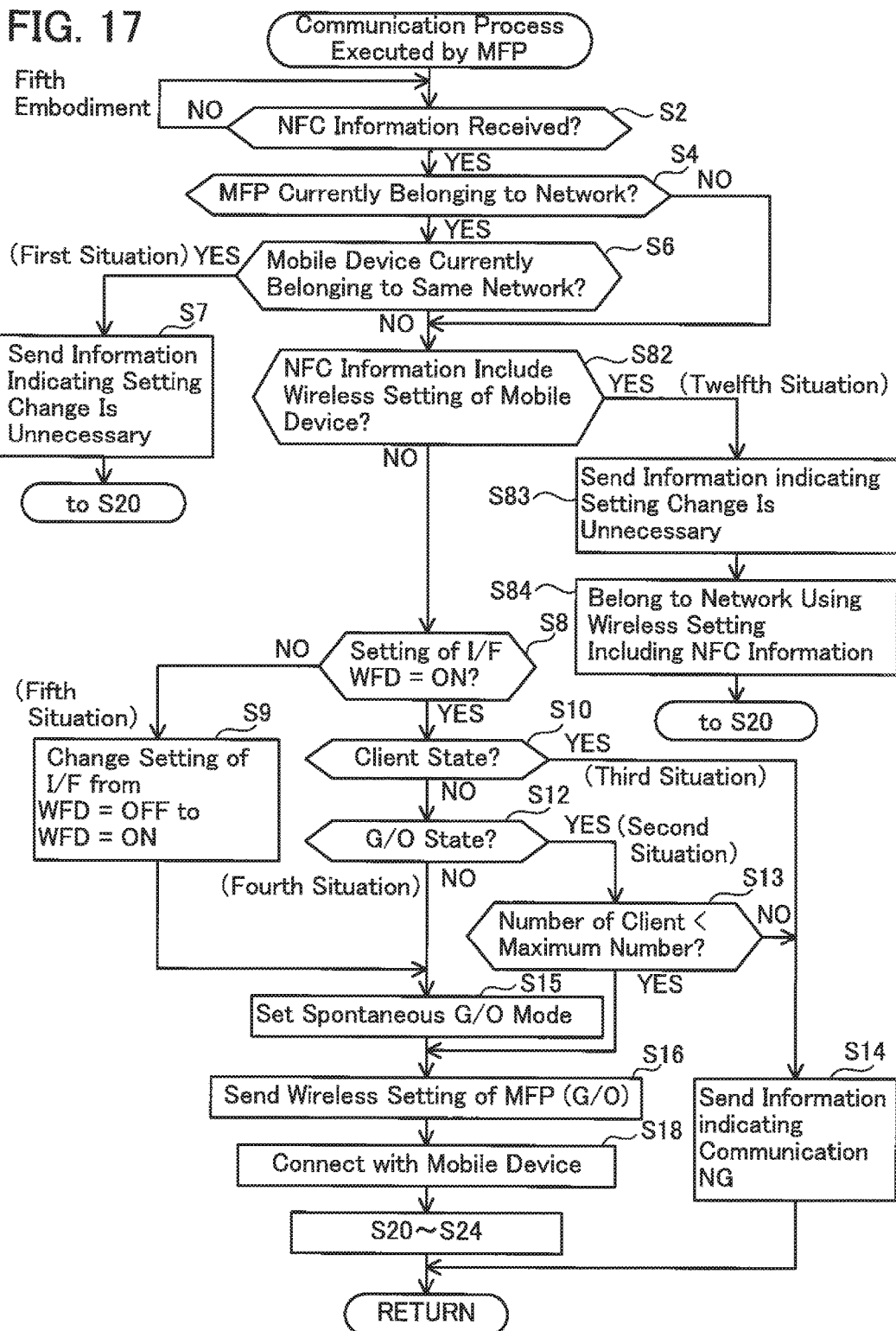
FIG. 17 shows a flowchart of a communication process executed by a multi-function peripheral of a fifth embodiment.

Further, in the present embodiment, a communication process of FIG. 17 is executed instead of the communication process of FIG. 2. S2 to S24 of FIG. 17 are the same as the processes S2 to S24 of FIG. 2. In the case of NO in S4 (i.e., in the case where the MFP 10 does not currently belong to a network), or in the case of NO in S6 (i.e., in the case where the MFP 10 and the mobile device 50 do not belong to the same network), in S82 the determining unit 42 determines whether the wireless setting is included in the NFC information received from the mobile device 50 by using the NFC I/F 22. In the case where it is determined that the wireless setting is included (YES in S82), in S83 the information indicating setting change is unnecessary is sent to the mobile device 50 by using the NFC I/F 22. Next, in S84, by using the wireless setting included in the NFC information, the communication executing unit 44 joins the network to which the mobile device 50 belongs, and the process proceeds to S20.

On the other hand, in the case where it is determined that the wireless setting is not included in the NFC information (NO in S82), the process proceeds to S8.

Advantages of Present Embodiment

The MFP 10 of the fifth embodiment can achieve the same advantages as the MFP 10 of the first embodiment in the first to fifth situations. The advantages of the present embodiment in a twelfth situation will be described with reference to FIG. 18. Moreover, processes corresponding to the communication process of FIG. 17 are shown in FIG. 18.

(Twelfth Situation)

Figure 18:
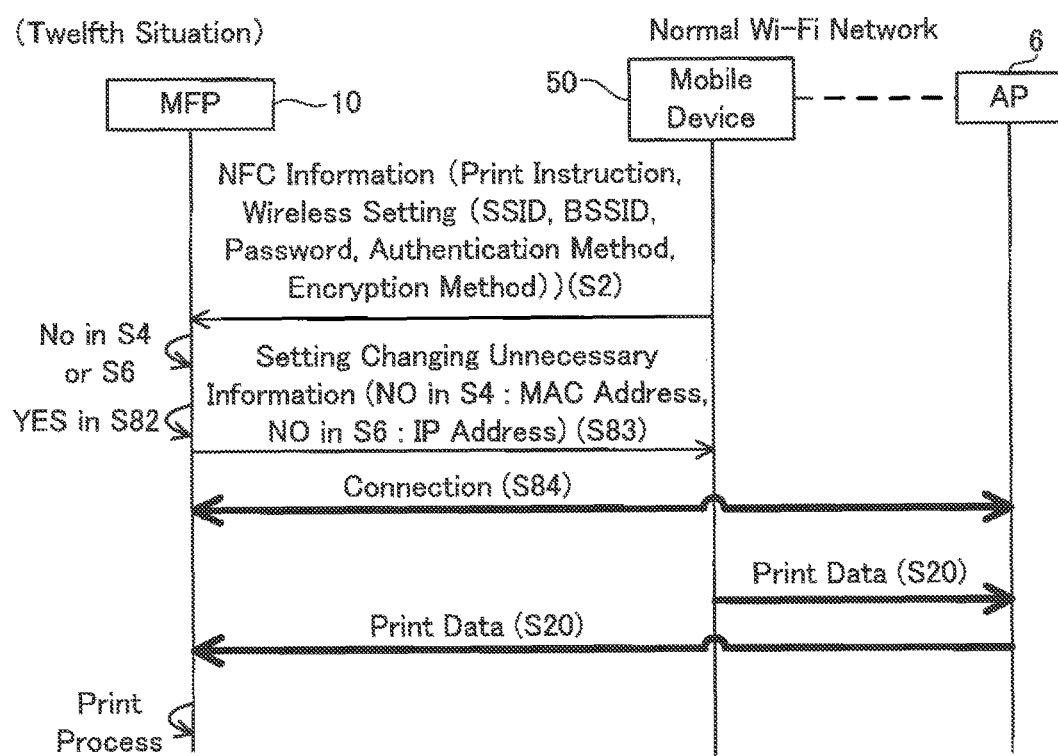
FIG. 18 shows a sequence view for explaining processes executed by devices in a twelfth situation.

In the twelfth situation shown in FIG. 18, the MFP 10 does not currently belong to a network, or currently belongs to a network to which the mobile device 50 does not belong. On the other hand, the mobile device 50 currently belongs to a normal Wi-Fi network to which the AP 6 belongs.

In this situation, upon receiving NFC information from the mobile device 50 via the NFC I/F 22, the MFP 10 determines that the MFP 10 and the mobile device 50 do not currently belong to the same network (NO in S4 or NO in S6). Next, in S82 the MFP 10 determines that the wireless setting for belonging to the network to which the mobile device 50 currently belongs is included in the NFC information (YES in S82).

Next, in S83 the MFP 10 sends the information indicating setting change is unnecessary to the mobile device 50 by using the NFC I/F 22. Moreover, in the case of NO in S4 (i.e., the case where the MFP 10 does not currently belong to a network), the MFP 10 sends information indicating setting change is unnecessary including the MAC address of the MFP 10 to the mobile device 50. Further, in the case of NO in S6 (i.e., the case where the MFP 10 currently belongs to a network, but the MFP 10 and the mobile device 50 do not belong to the same network), the MFP 10 sends information indicating setting change is unnecessary including the IP address of the MFP 10 to the mobile device 50.

The MFP 10 establishes a normal Wi-Fi connection with the AP 6 by using the wireless setting included in the NFC information (S84). In the case where the IP address of the MFP 10 is included in the information indicating setting change is unnecessary, the mobile device 50 specifies that IP address in the destination, and sends print data to the MFP 10 via the AP 6 (S20). Further, in the case where the MAC address of the MFP 10 is included in the information indicating setting change is unnecessary, the mobile device 50 identifies the IP address of the MFP 10 in accordance with RARP (abbreviation of: Reverse Address Resolution Protocol), specifies the identified IP address in the destination, and sends print data to the MFP 10 via the AP 6 (S20).

According to this configuration, in the case where the MFP 10 and the mobile device 50 do not belong to the same network, the MFP 10 can appropriately execute the communication of print data with the mobile device 50 via the network to which the mobile device 50 currently belongs.

(Corresponding Relationships)

The processes S15 to S18 and the processes S83, S84 of FIG. 17 are an example of the "specific process". In the case where YES is determined in S82 of FIG. 17, the network to which the mobile device 50 belongs is an example of the "third wireless network".

Sixth Embodiment

Figure 19:
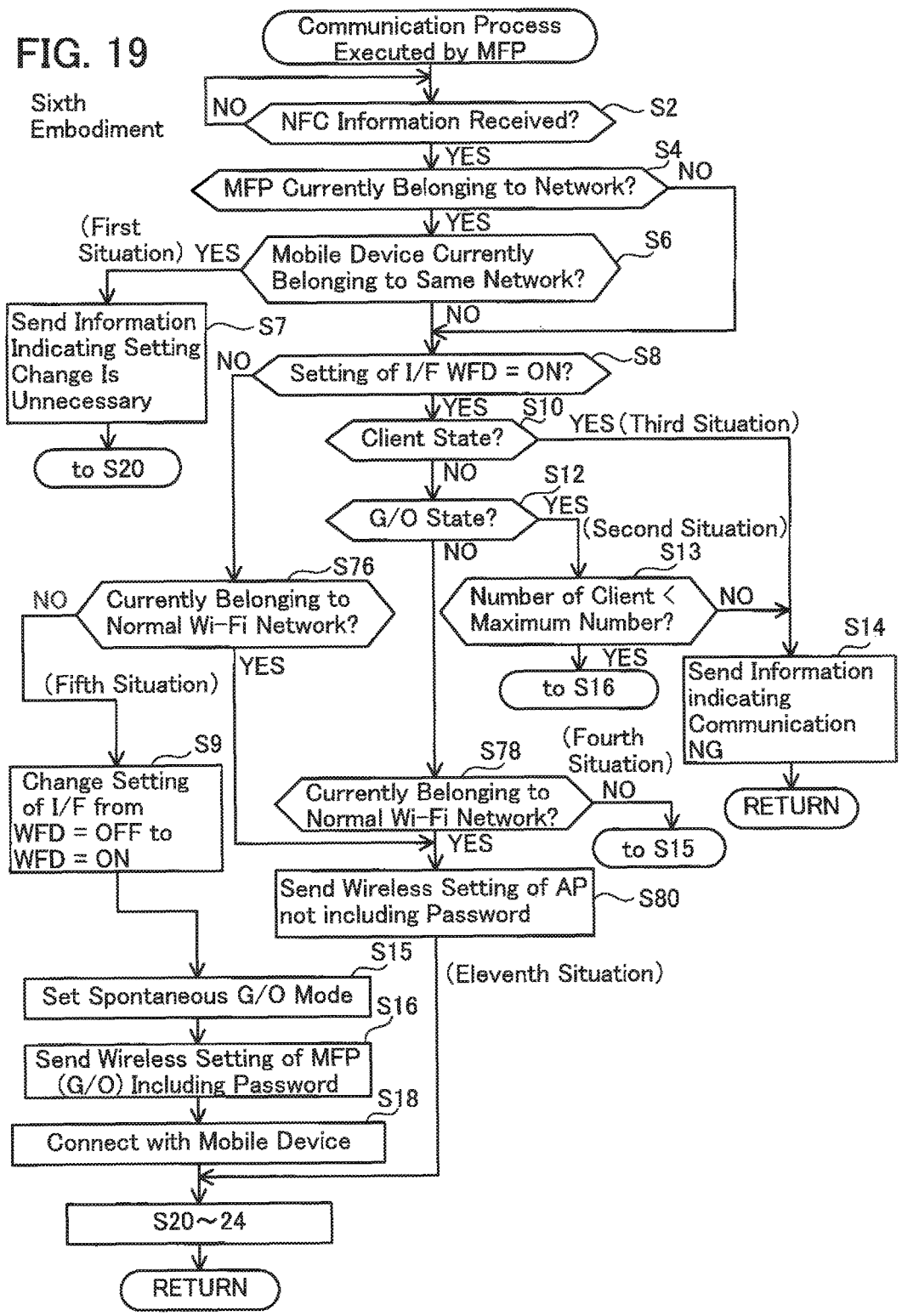
FIG. 19 shows a flowchart of a communication process executed by a multi-function peripheral of a sixth embodiment.

Points differing from the fourth embodiment will be described. In the present embodiment, a communication process of FIG. 19 is executed instead of the communication process of FIG. 14. In the communication process of FIG. 19, in the case where YES is determined in S10, a process the same as S14 of FIG. 2 is executed without the process S72 of FIG. 14 being executed.

According to this configuration, the same advantages as in the third situation can be achieved.

Seventh Embodiment

Figure 20:
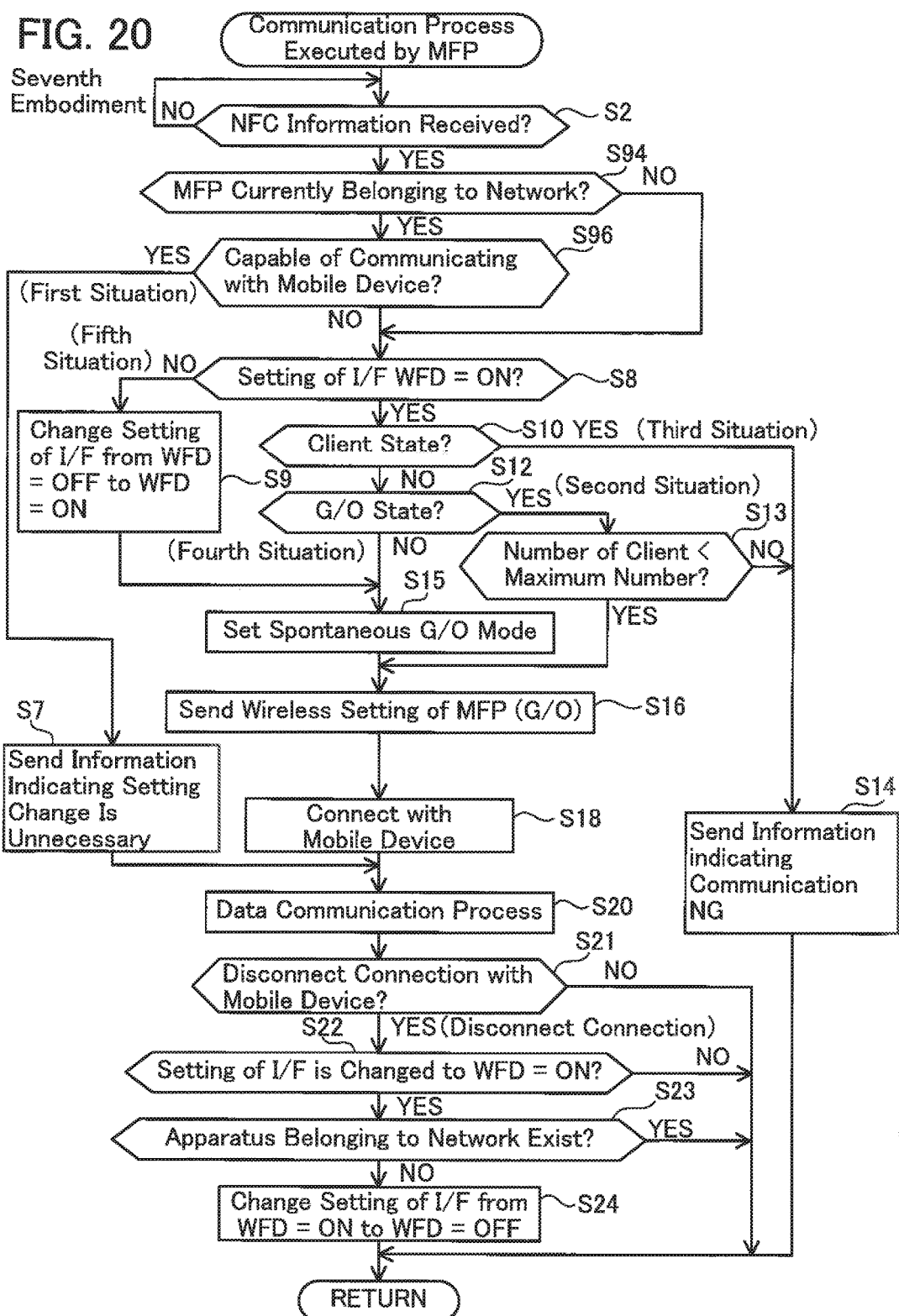
FIG. 20 shows a flowchart of a communication process executed by a multi-function peripheral of a seventh embodiment.

Points differing from the first embodiment will be described. The MFP 10 of the present embodiment comprises a wired LAN I/F (not shown) in addition to the I/Fs 20, 22. In the present embodiment, a communication process of FIG. 20 is executed instead of the communication process of FIG. 2. S2, S8 to S24 of FIG. 20 are the same as the processes of S2, S8 to S24 of FIG. 2.

As shown in FIG. 20, when NFC information is received by using the NFC I/F 22 (YES in S2), in S94 the determining unit 42 determines whether the MFP 10 currently belongs to a wired network that uses the wired LAN I/F and, further, whether the MFP 10 currently belongs to the wireless network that uses the wireless LAN I/F 20. Specifically, in the case where the MFP 10 currently belongs to the wired network by using the wired LAN I/F, information indicating that the MFP 10 currently belongs to the wired network is stored in the work area 38 of the memory 34. In the case where the information indicating that the MFP 10 currently belongs to the wired network is being stored in the work area 38, the determining unit 42 determines that the MFP 10 currently belongs to a wired network (YES in S94). Further, in the case where the information indicating that the MFP 10 currently belongs to the wired network is not being stored in the work area 38, the determining unit 42 determines that the MFP 10 does not currently belong to the wired network (NO in S94). The determination as to whether the MFP 10 currently belongs to the wireless network is the same as in the first embodiment.

If it is determined in S94 that the MFP 10 currently belongs to the wired network or the wireless network, or to both networks (YES in S94), the process proceeds to S96. If it is determined in S94 that the MFP 10 does not belong to either the wired network or the wireless network (NO in S94), the process proceeds to S8.

In S96 the control unit 30 determines whether the MFP 10 is in a state of being capable of executing the communication of the object data with the mobile device 50 via the network to which the MFP 10 currently belongs (either the wired network or the wireless network). Specifically, this will be described according to a thirteenth situation of FIG. 21.

Figure 21:
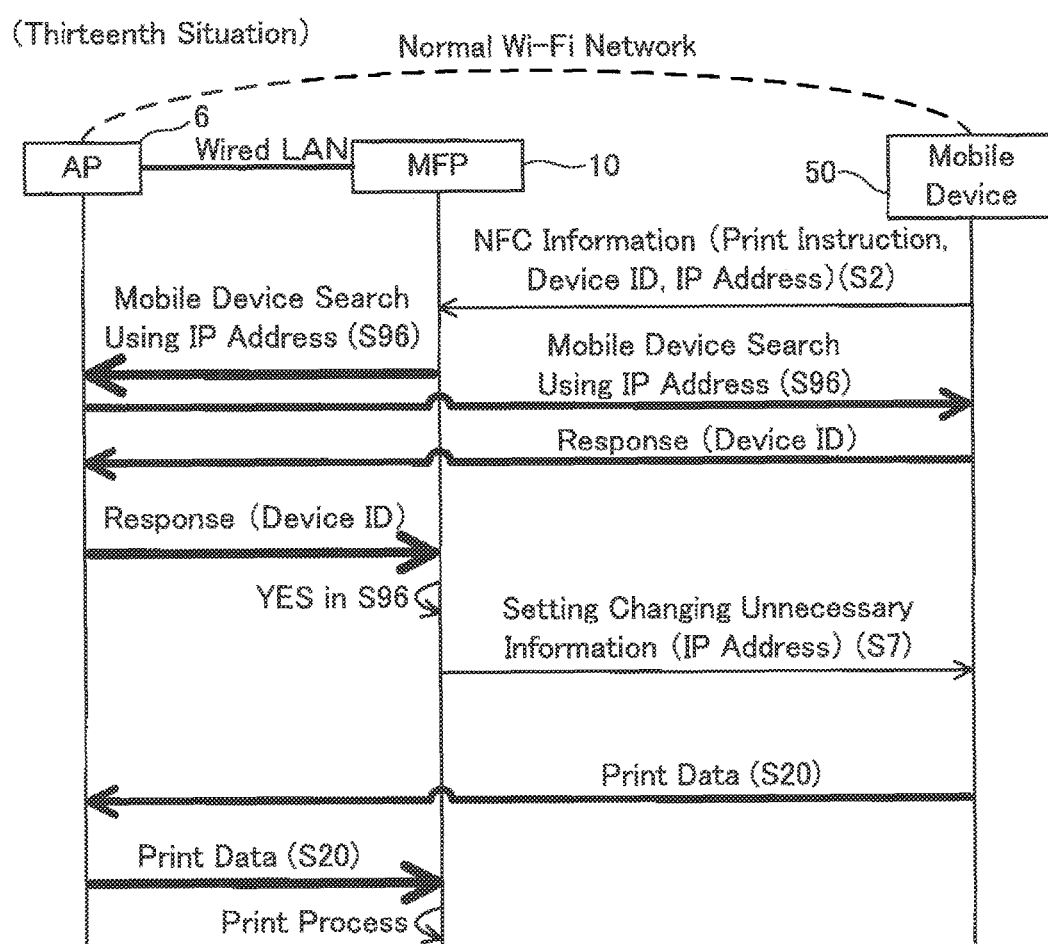
FIG. 21 shows a sequence view for explaining processes executed by devices in the seventh embodiment.

FIG. 21 shows an example in which the MFP 10 is connected with the AP 6 via the wired LAN, and the mobile device 50 is connected with the AP 6 via the normal Wi-Fi network.

Moreover, in the sequence view of FIG. 21, communication using the wired LAN I/F is represented by arrows. The arrows representing communication using the wired LAN I/F are fatter than the arrows representing wireless communication using the wireless LAN I/F 20.

The MFP 10 receives NFC information from the mobile device 50. The NFC information sent from the mobile device 50 includes the device ID and the IP address of the mobile device 50. In S96 the determining unit 42 determines whether the MFP 10 is capable of communicating with the mobile device 50 via the network to which the MFP 10 currently belongs (the wired LAN in the example of FIG. 21). Specifically, the determining unit 42 unicasts a device ID inquiry by using the wired LAN I/F. The determining unit 42 specifies the IP address included in the NFC information as the destination of the inquiry, and sends the inquiry.

Upon receiving the inquiry via the AP 6, the mobile device 50 sends the device ID of the mobile device 50 to the MFP 10 that is the source of the inquiry. Upon receiving the device ID of the mobile device 50 via the AP 6, by using the wired LAN I/F, the determining unit 42 determines whether the received device ID and the device ID included in the NFC information are identical. In the case where the two device IDs are identical, the determining unit 42 determines YES in S96, and proceeds to S7. On the other hand, in the case where there is no response to the inquiry or the two device IDs are not identical, the determining unit 42 determines NO in S96, and proceeds to S8.

According to this configuration, in the case where the current state of the MFP 10 is a state capable of communicating with the mobile device 50, the MFP 10 can execute the communication of object data with the mobile device 50 by using the wired LAN I/F.

In the first embodiment, it is determined in S6 whether the MFP 10 and the mobile device 50 are present in the same network. By contrast, in the present embodiment, in S96 it is determined whether the MFP 10 and the mobile device 50 are capable of communication regardless of whether the MFP 10 and the mobile device 50 are present in the same network.

(Corresponding Relationships)

The wireless LAN I/F and wired LAN I/F are an example of the "second type of interface". The wired LAN is an example of the "first wireless network". The device ID included in the NFC information is an example of the "terminal identification information".

(Modifications)

(1) The "communication device" is not restricted to the multi-function peripheral, but may be another apparatus comprising the first type of interface and the second type of interface (e.g., printer, FAX device, copier, scanner, etc.).

(2) The MFP 10 may store an AP program for functioning as an access point. Upon activation of the AP program, the control unit 30 may store a predetermined wireless setting in the work area 38. For example, in S15 of FIG. 2, the communication executing unit 44 may activate the AP program instead of setting the MFP 10 to spontaneous G/O mode. Next, the communication executing unit 44 may send the wireless setting that has been pre-stored in the work area 38 to the mobile device 50. Thereupon, the communication executing unit 44 and the mobile device 50 may establish a connection by using the wireless setting pre-stored in the work area 38. In this case, the MFP 10 may establish a normal Wi-Fi connection with the mobile device 50 and, further, the MFP 10 may construct a normal Wi-Fi network. In the present modification, the normal Wi-Fi which the MFP 10 executes with the mobile device 50 by activating the AP program and functioning as the access point is an example of the "specific wireless communication". Further, the activation of the AP program, sending of the wireless setting, and establishment of the normal Wi-Fi connection is an example of the "specific process".

(3) The combination of the "first type of interface" and the "second type of interface" is not restricted to the combination of the NFC I/F and the wireless LAN I/F. For example, in the case where the wireless LAN I/F is adopted as the "second type of interface", the "first type of interface" may be an interface for executing infrared communication, an interface for executing Bluetooth (registered trademark), or an interface for executing Transfer Jet. Further, in the case where the NFC I/F is adopted as the "first type of interface", the "second type of interface" may be an interface for executing wired communication, or an interface for executing Bluetooth (registered trademark). In general terms, the combination of the interfaces may be any combination whereby the communication speed of communication via the second type of interface is faster than the communication speed of communication via the first type of interface.

(4) The "first type of interface" and the "second type of interface" may physically be two interfaces (i.e., two separate IC chips), as in the above embodiments, or may physically be one interface (i.e., two types of communication are realized with one IC chip).

(5) In the above embodiments, the interface for executing wireless communication according to the WFD system and the interface for executing wireless communication according to normal Wi-Fi was physically one interface (the wireless LAN I/F 20). However, it may physically be a plurality of interfaces (i.e., two separate IC chips). In the present modification, the plurality of interfaces is an example of the "second type of interface".

(6) In the first, second, and fourth to seventh embodiments, in S15 the communication executing unit 44 sets the MFP 10 to spontaneous G/O mode. However, in the case where the mobile device 50 is capable of executing wireless communication according to the WFD system, the communication executing unit 44 may execute the processes S54 to S62 of FIG. 11 instead of S15 to S18. In the present modification, the processes S54 to S62 are an example of the "specific process".

(7) In the seventh embodiment, the determining unit 42 specifies the IP address included in the NFC information (i.e., the IP address of the mobile device 50) in the destination, and sends the device ID inquiry. However, the determining unit 42 may broadcast the device ID inquiry via the network to which the MFP 10 currently belongs (the wired network or the wireless network). In this case, the device ID inquiry may include the device ID included in the NFC information. When the broadcast inquiry has been received, in the case where the device ID included in the inquiry is the device ID of the mobile device 50, the mobile device 50 may send a response to the inquiry to the MFP 10 that is the source of the inquiry. The MFP 10 may receive the response to the inquiry via the network to which the MFP 10 currently belongs. In the case where the response is received, the determining unit 42 may determine that the current state of the MFP 10 is the state of being capable of communication with the mobile device 50 (YES in S6 of FIG. 2). According to the present modification, YES can be determined in S6 of FIG. 2 in the case where the MFP 10 and the mobile device 50 are in the same subnet. In the present modification, the determination of S6 is an example of the MFP 10 determining whether the "mobile device currently belongs to the specific network to which the communication device currently belongs".

(8) In the above embodiments, the units 40 to 46 are realized by software. However, one or more of the units 40 to 46 may be realized by hardware such as a logic circuit, etc.

The invention claimed is:

1. A communication device comprising:
a first type of interface configured to send specific information to a mobile device;
a second type of interface;
one or more processors; and
a memory that stores computer-readable instructions therein, the computer-readable instructions, when executed by the one or more processors, causing the communication device to:
in a case where the communication device is not currently in a communication-enabled state,
execute a specific process using the specific information in order for the communication device to shift to a communication-enabled state, the communication-enabled state being a state in which the communication device is currently capable of executing a communication of object data with the mobile device by the second type of interface, the specific information being information for establishing a wireless connection using the second type of interface with the communication device, and the specific process including a process of establishing the wireless connection with the mobile device using the specific information; and
execute the communication of the object data with the mobile device using the second type of interface after executing the specific process; and
in a case where the communication device is currently in the communication-enabled state, execute communication of the object data with the mobile device using the second type of interface without executing the specific process.

2. The communication device as in claim 1, wherein the communication device is capable of selectively operating in one of a plurality of states including a parent station state in which the communication device functions as a parent station of a wireless network and a non-parent station state in which the communication device does not function as the parent station of the wireless network, and
the specific process includes a process of setting the parent station state to the communication device in a wireless connection with the mobile device.

3. The communication device as in claim 1, wherein the specific information includes Service Set Identifier.

4. The communication device as in claim 1, wherein the first type of interface is configured to execute a wireless communication according to a Near Field Communication system, and the second type of interface is configured to execute a wireless communication according to a system based on IEEE 802.11 standard.

5. The communication device as in claim 1, wherein a communication speed of the second type of interface is faster than a communication speed of the first type of interface.

6. The communication device as in claim 1, further comprising:
a print executing unit,
wherein the executing of the communication of the object data with the mobile device includes receiving the object data from the mobile device, and
the computer-readable instructions, when executed by the one or more processors, cause the communication device to further execute:
causing the print executing unit to execute a print using the object data.

7. The communication device as in claim 1, further comprising:
a scan executing unit,
wherein the computer-readable instructions, when executed by the one or more processors, cause the communication device to further execute:
causing the scan executing unit to execute a scan of a document set on the scan executing unit and generate the object data,
wherein the executing of the communication of the object data with the mobile device includes sending the object data to the mobile device.

8. A non-transitory computer-readable storage medium storing computer-readable instructions for a communication device comprising a first type of interface configured to send specific information to a mobile device, and a second type of interface, wherein the computer-readable instructions, when executed by one or more processors mounted on the communication device, cause the communication device to:
in a case where the communication device is not currently in a communication-enabled state,
execute a specific process using specific information in order for the communication device to shift to a communication-enabled state the communication-enabled state being a state in which the communication device is currently capable of executing a communication of object data with the mobile device by the second type of interface, the specific information being information for establishing a wireless connection using the second type of interface with the communication device, and the specific process including a process of establishing the wireless connection with the mobile device using the specific information; and
execute the communication of the object data with the mobile device using the second type of interface after executing the specific process; and
in a case where the communication device is currently in the communication-enabled state, execute communication of the object data with the mobile device using the second type of interface without executing the specific process.

* * * * *